(12) United States Patent
Maruyama

(10) Patent No.: US 6,713,983 B2
(45) Date of Patent: Mar. 30, 2004

(54) SERVO-CONTROL APPARATUS FOR MOTOR

(75) Inventor: Shoji Maruyama, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/106,318

(22) Filed: Mar. 27, 2002

(65) Prior Publication Data

US 2002/0101213 A1 Aug. 1, 2002

Related U.S. Application Data

(62) Division of application No. 09/553,960, filed on Apr. 21, 2000.

(30) Foreign Application Priority Data

| Apr. 27, 1999 | (JP) | .............................................. | 11-119362 |
| Jun. 11, 1999 | (JP) | .......................................... | 11-164724 |
| Feb. 29, 2000 | (JP) | ........................................ | 2000-053422 |

(51) Int. Cl.[7] .............................................. G05B 11/01
(52) U.S. Cl. .................. 318/560; 318/568.1; 318/568.2; 318/567; 318/565; 318/599; 318/609
(58) Field of Search .............................. 318/560, 568.1, 318/568.2, 567, 565, 555, 254, 811, 138, 43.9, 700, 705, 806, 609

(56) References Cited

U.S. PATENT DOCUMENTS

| 4,874,997 A | 10/1989 | Daggett et al. ........... 318/568.1 |
| 5,350,988 A | 9/1994 | Le ................................ 318/618 |
| 5,757,147 A | 5/1998 | Blumör et al. ................. 318/41 |
| 6,181,092 B1 | 1/2001 | Turner ......................... 318/254 |
| 6,184,648 B1 | 2/2001 | Kato et al. ................... 318/811 |
| 6,204,986 B1 | 3/2001 | Hirose ......................... 318/254 |
| 6,483,270 B1 * | 11/2002 | Miyazaki et al. ........... 318/700 |
| 6,501,243 B1 * | 12/2002 | Kaneko et al. ............. 318/700 |

FOREIGN PATENT DOCUMENTS

| JP | 2-95190 | 4/1990 |
| JP | 4-125093 | 4/1992 |

OTHER PUBLICATIONS

Gleim, et al., "Combined Smart Power IC for VCR with PWM Controlled Motor Voltage," IEEE Transactions on Consumer Electronics, vol. 40, No. 3, Aug. 1994, pp. 377–385.

* cited by examiner

Primary Examiner—Karen Masih
(74) Attorney, Agent, or Firm—Fitzpatrick, Cella, Harper & Scinto

(57) ABSTRACT

The present invention provides a servo-control apparatus for a motor, comprising position detecting means for detecting a rotational position of a motor, rotational speed signal generating means for generating a rotational speed signal corresponding to a rotational speed of a motor, and digital control means for generating an exciting electric current to be supplied to a coil of the motor as a PWM signal in accordance with the rotational speed signal from the rotational speed signal generating means, and wherein a switching signal for switching the exciting electric current to be supplied to the coil of the motor is formed by a pre-driver in accordance with the position detection signal from the position detecting means, and the pre-driver combines the switching signal with the PWM signal from the digital control means to generate an electric current control signal by which the motor is driven, thereby coping with the speed change of the motor quickly and stably.

15 Claims, 16 Drawing Sheets

| FIG.6A |
| FIG. 6B |

SERVO-CONTROL APPARATUS FOR MOTOR

This application is a Divisional Application of U.S. patent application Ser. No. 09/553,960, filed Apr. 21, 2000.

BACKGROUND OF THE INVENTION

1. Field of the Invention

The present invention relates to a servo-control apparatus for motor, servo-controlling a motor by using a DSP as digital control means, and more particularly it relates to a motor servo-control apparatus suitable for controlling a plurality of motors used in an image forming apparatus.

2. Related Background Art

FIGS. 12 and 13 are conventional circuit diagrams for effecting servo-control of a plurality of motors by using a micro computer. Particularly, FIG. 12 is a block diagram showing an entire circuit in which a plurality of motor units 301 having the same construction are connected to a single micro computer 300, and FIG. 13 is a block diagram showing an internal construction of one of the motor units 301.

Now, the conventional servo-control will be described. In FIGS. 12 and 13, there are shown a micro computer 300, motor units 301, a control IC 302, a three-phase motor 303, three hole sensors 304 for detecting a position of a main pole of a rotor, an FG sensor 305 for detecting a pattern magnetized on the rotor and for outputting 36 pulses per one revolution of the motor, an oscillator 306, a current detecting resistor 307, a control portion 308, a driver portion 309, an electric current limiter detecting portion 310, a speed control portion 311, a frequency divider 312, an integration amplifier 313, resistors and capacitors constituting integration filters 314 to 317, a control signal 318 emitted from the micro computer 300 and adapted to drive/stop the motor, and a ready signal 319 which becomes active when the motor reaches a predetermined revolution number.

Next, an operation of the circuit will be described. When a motor driving command is emitted from the micro computer 300 controlling an image forming apparatus through the signal line 318, the control portion 308 detects the position of the main pole of the rotor of the motor 303 by the hole sensors 304 and forms a three-phase exciting pattern so as to rotate the motor in a desired direction and sends an exciting signal to the driver portion 309. On the basis of the exciting signal, the driver portion 309 drives an output transistor (not shown) so that an electric current direction with respect to a coil of the motor is switched to generate desired excitation. On the other hand, when the rotor of the motor 303 is rotated, predetermined pulses are generated by the FG sensor 305 and are sent to the speed control portion 311. In the speed control portion 311, a reference clock formed by the oscillator 306 and the frequency divider 312 is compared with the pulse detected by the FG sensor 305, and the difference therebetween is outputted.

Incidentally, the reference clock is set to obtain a target revolution number (number of revolutions) of the motor. Namely, when the FG sensor outputs 30 pulses per one revolution of the motor, in order to rotate the motor at 600 rpm, the reference clock of 300 Hz (=(600/60)×30) may be given.

The difference with respect to the target speed obtained by the speed control portion 311 is integrated by the integration amplifier 313, and a result is sent to the driver portion 309. In this case, gain and a phase compensation value are determined by the resistors and capacitors 314 to 317. These constants are referred to as servo constants.

Further, in the driver portion 309 for the motor of the conventional image forming apparatus, a transistor of bipolar type is used. Thus, since heat loss of the driver portion is great, a radiator plate is provided. Further, in order to reduce heat generation due to such heat loss as much as possible, the efficiency of the motor must be increased so that the desired power can be obtained with the least electric power. To this end, a brushless motor of the outer rotor type having good efficiency is used.

As mentioned above, in the conventional circuit arrangement, the motor is controlled by sending only stop/start signals to the motor units 301 from the micro computer 300, and a servo-control loop is formed in each motor unit 301. The reason for this is that, since the processing ability of the conventional micro computer is limited, servo-control must be effected in each motor unit 301. As the processing ability of the micro computer or a DSP (digital signal processor) has been improved, servo-control for the motors has been able to be effected by the micro computer or the DSP itself. Further, due to an increase in processing ability of the DSP, a plurality of motors have been able to be servo-controlled independently.

As a result, in place of the above-mentioned conventional circuit arrangement, it has been considered to provide a circuit having motors servo-controlled by the DSP. Such a circuit will be explained herein below. FIGS. 14 and 15 are views showing such a circuit. Particularly, FIG. 14 is a block diagram showing an entire circuit in which a plurality of motor units are connected to a single DSP, and FIG. 15 is a block diagram showing the internal construction of one of the motor units.

In FIGS. 14 and 15, there are shown a DSP 501 serving to control six motors 505, motor units 502 each including a drive circuit, a driver 504, a three-phase DC brushless motor 505, a charge pump circuit 401 for generating gate voltage for N-chMOS of the driver 504, pre-driver circuits 402 to 407, exciting switching signals 408 to 413, a current sense signal 414, hole sensor signals 415 to 417, an MR sensor signal 418, hole sensor amplifiers 419 to 421, an MR sensor amplifier 422, N-chMOS transistors (driver portions) 515 to 520, a current detecting resistor 521, U-phase output 522 connected to a U-phase coil of the motor, V-phase output 523 connected to a V-shape coil, W-phase output 524 connected to a W-phase coil, hole sensors 525 to 527, an MR sensor 528, and a serial communication bus 532 for effecting communication with a control CPU (not shown) of the image forming apparatus.

Next, an operation of this servo-control circuit will be described. First of all, when a motor drive command is transmitted from the CPU through the serial communication line 532, the DSP 501 ascertains the position of the rotor detected by the hole sensors 525 to 527 on the basis of the hole sensor signals 415 to 417 and determines the switching timing so as to obtain the desired rotation and effects control on the basis of the switching signals 408 to 413 to give a desired rotational direction and a desired electric current to the motor.

Namely, the N-chMOS transistors 515 to 520 are switched to give the desired rotational direction, and the N-chMOS transistors 515, 517, 519 are PWM-switched to cause the desired electric current to flow into the coil of the motor. In this case, the gate voltages of the N-chMOS transistors 515, 517, 519 are increased to Vcc+10V by the charge pump circuit 401.

For example, when the DSP 501 ascertains the rotor position of the motor on the basis of the hole sensor signals 415 to 417 amplified by the hole sensor amplifiers 419 to 421 and the hole sensors 525 to 527 and switches the direction of the electric current from the U-phase 522 to the W-phase 523 to obtain the desired rotational direction, the pre-drivers 402 to 407 turn ON the N-chMOS transistors 515, 518 and turn OFF the transistors 516, 517, 519, 520. As a result, an electric current path extends from Vcc to the current detecting resistor 521 through the transistor 515, U-phase output 522, V-phase output 523 and transistor 518, thereby generating a magnetic force in the desired coil. In this case, the PWM signal given by the DSP 501 is composed or combined with the switching signal 408, so that the N-chMOS transistor 515 is PWM-controlled by the pre-driver 402.

Accordingly, ON-duty electric current defined by the PWM signal flows from the U-phase to the V-phase. In this way, the motor is subjected to exciting switching control for switching the electric current to U, V, W-phase to rotate the rotor in the desired rotational direction, thereby generating torque by relative electromagnetic action between the main pole magnet (not shown) and the coil.

When the motor is subjected to the exciting switching control in this way to rotate the rotor, a pre-set MR sensor magnetizing pattern is detected by the MR sensor 528, thereby outputting 360 pulses per one revolution. Namely, a signal having frequency corresponding to the revolution number of the motor is obtained, and this signal is inputted to the DSP 501 as the MR sensor signal 418 through the amplifier 422.

The DSP 501 measures a pulse interval of the MR sensor signal 418 and seeks the speed (rad/s) of the motor and compares the motor speed with a target control speed and performs PI filter (not shown) and gain added calculation (not shown) to derive PWM pulse width and combines the pulse width with the switching signals 408, 410, 412 to control the current to be supplied to the motor coil, thereby controlling the motor to rotate at the target speed.

In this way, the DSP 501 effects the switching of the output stage N-chMOS transistor by generating the PWM signal and combining it with the switching signals, thereby performing the servo-control to rotate the motor at the desired number of revolutions. On the other hand, the position of the main pole is detected by the hole sensors 525 to 527, and the switching control is performed on the basis of the hole sensor signals 415 to 417 to rotate the rotor in the desired rotational direction. Further, the current flowing through the motor is detected by the electric current detecting resistor 521, and, there is provided protecting means for limiting the electric current if the current greater than a predetermined value flows.

In the conventional motor servo-control apparatus explained in connection with FIGS. 12 and 13, the micro computer effects drive/stop control of the drive motors, and each drive motor has serve-control IC and the serve-control is effected in each motor unit. Namely, the feedback loop is closed in the motor unit. Further, stability of the servo-control of each motor is determined by constants, i.e., serve constants of the resistors and capacitors connected to the integration amplifier of the circuit. Namely, these servo constants were required to be set so that the motors be rotated most stably and accurately under every conditions in consideration of load inertia and load torque.

As a result, when the above-mentioned conventional motor servo-control apparatuses are used as various drive means of an image forming apparatus of electrophotographic type having a cartridge integrally including toner and a photosensitive drum, if the load inertia and the torque of the drive motor for driving the photosensitive drum is greatly changed in dependence upon a difference in toner capacity, a difference in the kind of toner, or a difference in the cartridge used, there arose a problem that stable servo-control could not achieved under all conditions.

Further, in a color image forming apparatus, in order to enhance a glossy property of the apparatus, there is provided a glossy print mode in which a recording paper is conveyed at a speed slower than a normal recording paper conveying speed so that a time period during which the recording paper is passed through a fixing device is increased to improve toner fusion. Thus, the drive motors must be controlled with plural speeds, and, if the speed control range is wide, stable servo-control cannot be obtained by only one servo constant system.

As one method for solving this problem, there has been proposed a technique in which a plurality of integration amplifiers are provided and the amplifiers are switched in accordance with conditions. However, this technique has a disadvantage that the cost is increased considerably.

Further, in general, speed detecting means for the servo motor is provided on the motor itself, for the purpose of improvement in rotational accuracy and stability of the rotor of the motor.

In an image forming apparatus using such a motor, for example, if fluctuation in rotation due to fluctuation in load is caused on a shaft of a photosensitive drum, when such fluctuation in rotation can be corrected by the servo-control of the motor, the fluctuation in rotation of the drum shaft can be reduced, thereby obtaining good image quality. However, since the conventional motor is a DC brushless motor of outer rotor type having a main pole magnet of the rotating rotor, inertia of the rotor is great. Accordingly, the fluctuation in rotation generated on the drum shaft is hard to be transmitted to a drive shaft of the drum drive motor. As a result, even if the servo-control of the drum drive motor is performed accurately, unevenness in rotation of the drum cannot be improved, with the result that deterioration of image quality cannot be reduced.

Further, there is an image forming apparatus using a stepping motor in place of the DC brushless motor. However, the stepping motor has low efficiency in comparison with the DC brushless motor. Thus, particularly in the color image forming apparatus having a plurality of motors, if all of the motors are stepping motors, the load on the power supply of the apparatus becomes great, thereby increasing the total cost of the apparatus considerably. Further, since the stepping motor generates great vibration during step driving, when the plurality of stepping motors are used, the noise generated by the apparatus becomes great.

As an apparatus normally considered to eliminate the above-mentioned disadvantages of the conventional motor servo-control device shown in FIGS. 12 and 13, there is the motor servo-control apparatus explained in connection with FIGS. 14 and 15. In this servo-control apparatus, since the DSP performs all of the phase switching control, speed control, and electric current limiting control, if the number of the motor units connected to the DSP is increased, adequate processing cannot be achieved. Further, since a great number of signal lines are required between the DSP and the motor units (for example, eleven signal lines for each motor unit), the number of input/output pins is increased, with the result that the control ability of the interfaces may deteriorate. Further, in the electric current limitation, when the electric current detection voltage is sent from the motor unit to the DSP, if a distance between the motor unit and the DSP is long, noise will be generated.

When digital servo-control of the plural motors is effected by the DSP, if control timings for the motors overlap for the number of motors to be controlled, since the servo-control period of the motor does not become constant, unevenness in rotation of the motor will occur.

Further, the servo constant of the motor to be servo-controlled is determined by the torque constant, the inertia, and the coil resistance of the motor to be connected.

In such a construction, particularly when motors are purchased from different companies, the servo constant must be set so that stable servo-control can be achieved under all conditions of torque constants, inertia, and coil resistances of the motors to be used.

For example, the inertia of a motor of the outer-rotor type differs greatly from the inertia of a motor of the inner-rotor type. In such motors having different inertia, the setting of a proper servo constant is limited.

Namely, if the servo constant is set to match the motor of the outer rotor type to enhance the servo stability of the motor of the outer-rotor type, when the motor of the inner-rotor type is used, servo stability of such a motor will be worsened.

Thus, in the past, when the servo constant was selected, it was difficult to enhance the stability of servo-control of all of the motors to be used.

SUMMARY OF THE INVENTION

The present invention aims to eliminate the above-mentioned conventional drawbacks and an object of the present invention is to provide a motor servo-control apparatus which has a construction suitable for effecting servo-control by using a DSP as digital control means.

Another object of the present invention is to provide a motor servo-control apparatus in which a plurality of motors used in an image forming apparatus are controlled collectively by using a DSP as digital control means.

The other objects and features of the present invention will be apparent from the following detailed explanation referring to the accompanying drawings.

DESCRIPTION OF THE PREFERRED EMBODIMENTS

The present invention will now be explained with reference to the accompanying drawings.

Prior to explanation of a motor servo-control apparatus of the present invention, first of all, an image forming apparatus to which the motor servo-control apparatus of the present invention can be applied will be described.

Figure 1:
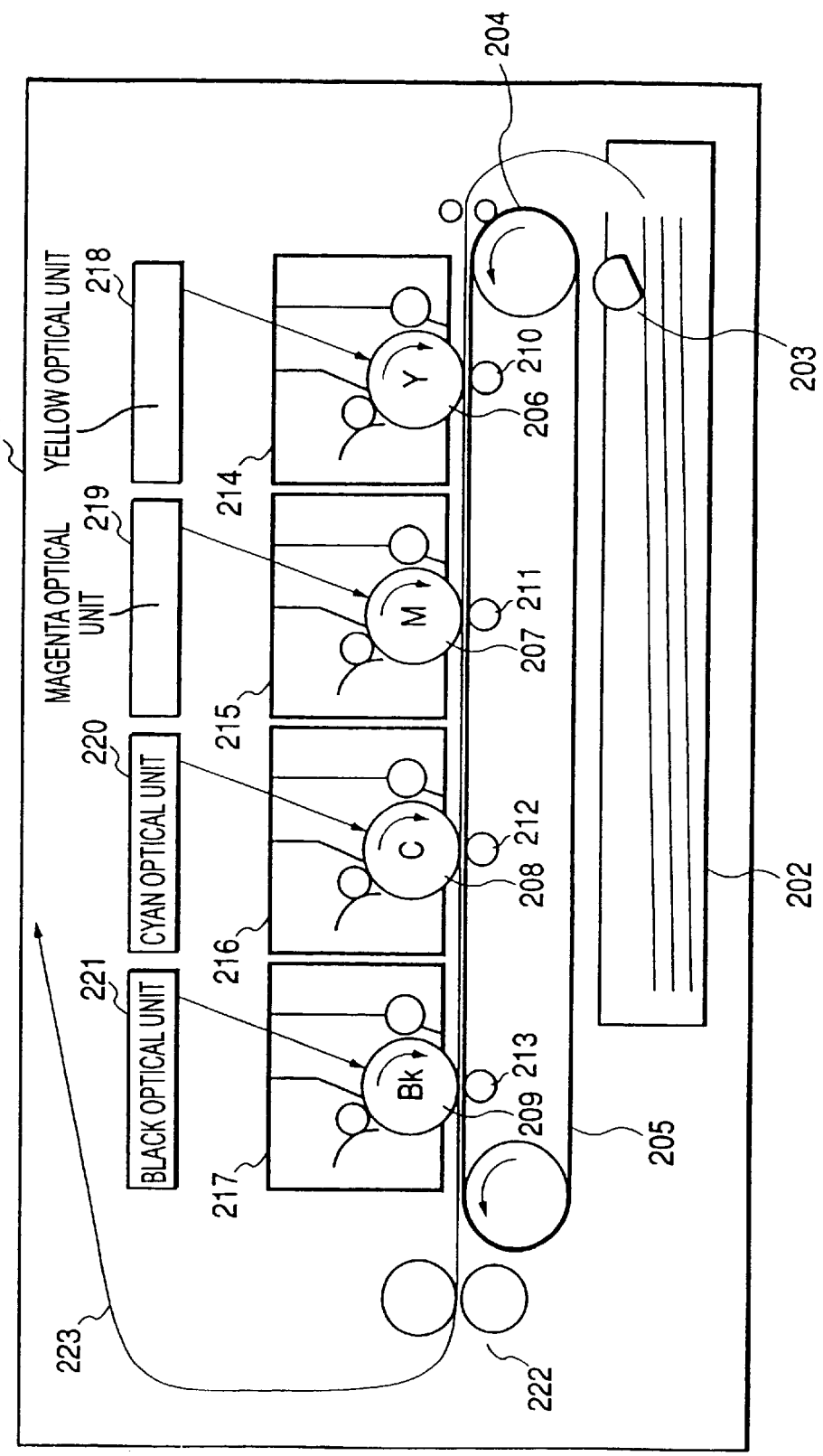
FIG. 1 is a schematic view showing an image forming apparatus according to the present invention.

FIG. 1 is a schematic view showing such an image forming apparatus. In FIG. 1, the image forming apparatus 201 comprises a sheet cassette 202, a pick-up roller 203, an electrostatic belt drive roller 204, an electrostatic belt 205, an yellow photosensitive drum 206, a magenta photosensitive drum 207, a cyan photosensitive drum 208, a black photosensitive drum 209, an yellow transfer roller 210, a magenta transfer roller 211, a cyan transfer roller 212, a black transfer roller 213, an yellow cartridge 214, a magenta cartridge 215, a cyan cartridge 216, a black cartridge 217, an yellow optical unit 218, a magenta optical unit 219, a cyan optical unit 220, a black optical unit 221, a fixing roller 222 and a sheet path 223.

The image forming apparatus serves to perform an electrophotographic process on the basis of a command from a host computer (not shown) to transfer yellow, magenta, cyan and black images onto a paper in a superimposed fashion. Further, the pick-up roller 203 is driven by a pick-up roller motor, the electrostatic belt is driven by a belt motor, the photosensitive drums are driven by respective color drum motors, and the fixing roller is driven by a fixing motor, and drive/stop of each motor is controlled by a servo control apparatus provided in the image forming apparatus.

Figure 2:
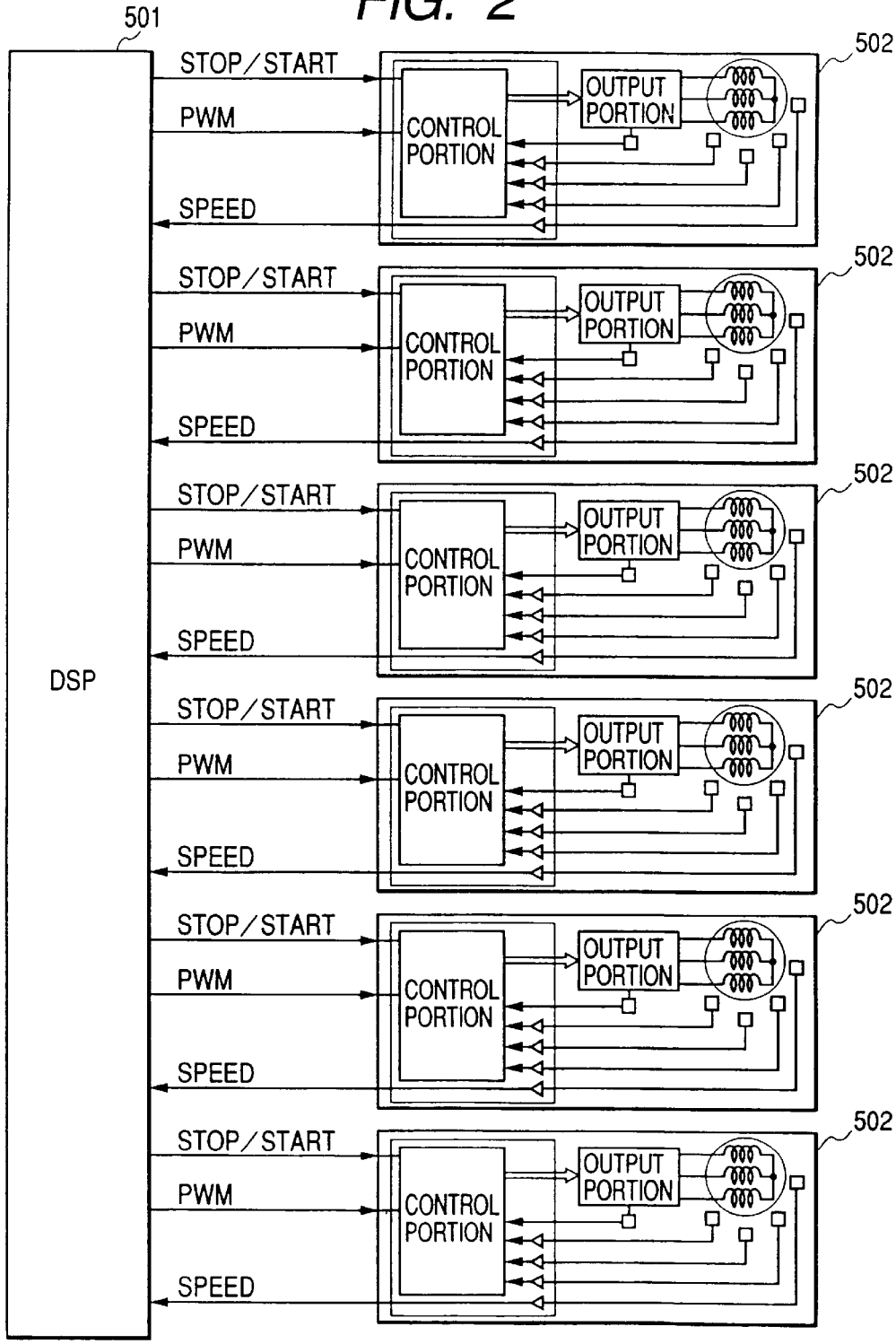
FIG. 2 is a view showing a motor servo-control apparatus used in the image forming apparatus of FIG. 1 and particularly showing a block diagram of an entire circuit in which a plurality of circuit units are connected to a single DSP.
Figure 3:
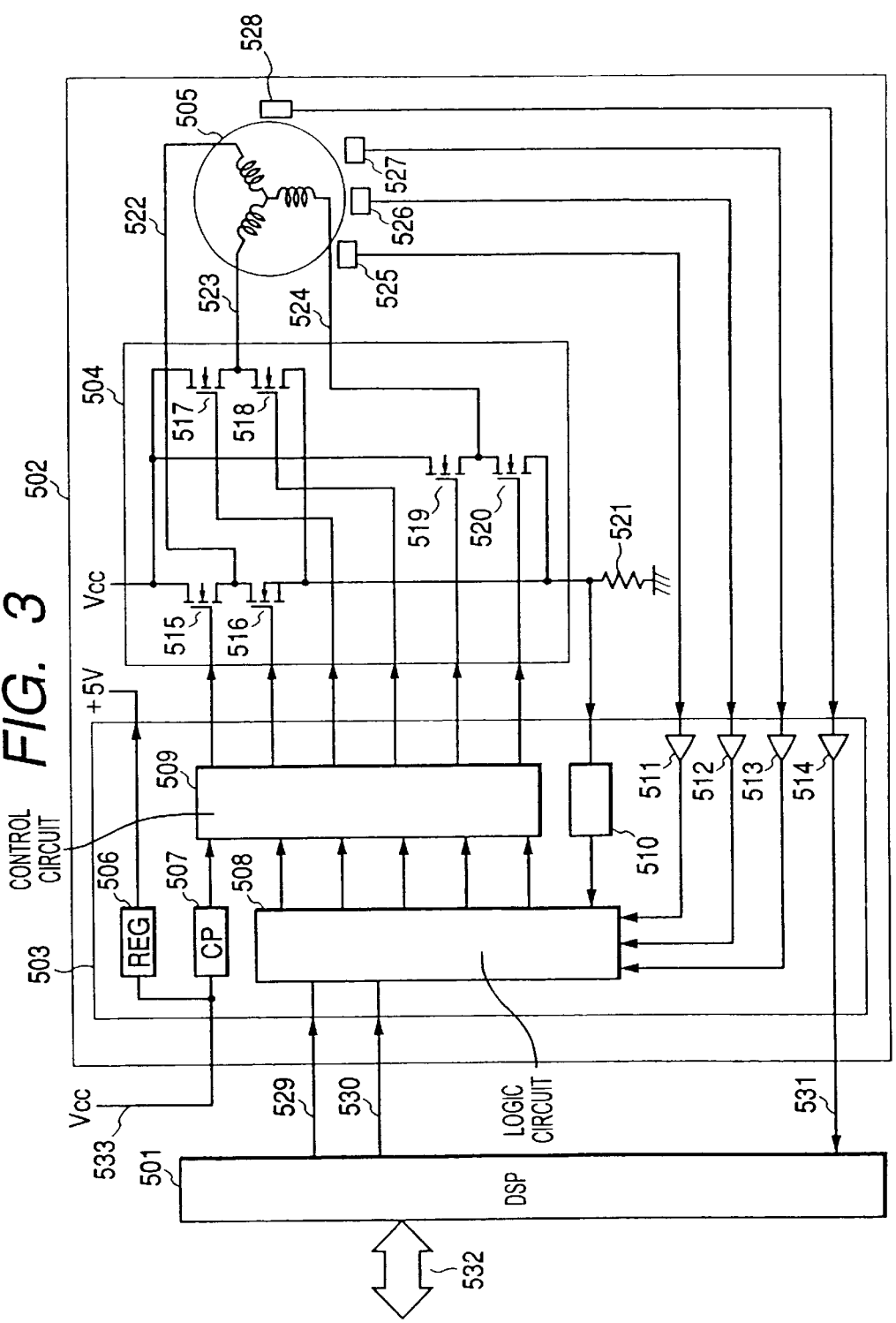
FIG. 3 is a block circuit diagram showing the internal circuitry of one of the plural motor units shown in FIG. 2.

FIGS. 2 and 3, a DSP (digital signal processor) 501 as a digital control device is capable of performing product/addition calculation quickly. Motor units 502 include drive circuits (pre-driver, driver) and have the same construction and comprise, from the above, a motor unit having an yellow photosensitive drum motor $505_1$, a motor unit having a magenta photosensitive drum motor $505_2$, a motor unit having a cyan photosensitive drum motor $505_3$, a motor unit having a black photosensitive drum motor $505_4$, a motor unit having a belt motor $505_5$, and a motor unit having a fixing motor $505_6$ Incidentally, the pick-up roller 203 is driven by a stepping motor, which does not relate to the servo-control apparatus of the present invention. The DSP 501 serves to control six motors $505_1$ to $505_6$. As each of these motors, a DC brushless motor of the inner-rotor type, having a small inertia and capable of improving control accuracy, is used. In FIG. 3, there are shown a pre-driver 503 having a logic circuit and a control circuit which will be described later, a driver 504, a three-phase DC brushless motor 505, a regulator 506, a charge pump circuit 507 for generating gate voltage for N-chMOS of the driver 504, a logic circuit 508 for composing or combining a PWM signal from the DSP 501 with switching signals (which will be described later), a control circuit 509 for boosting the output from the logic circuit, an electric current limiter 510, hole sensor amplifiers 511 to 513, an MR sensor amplifier 514, N-chMOS transistors 515 to 520 provided in the driver, an electric current detecting resistor 521, a U-phase output 522 connected to a U-phase coil of the motor, a V-phase output 523 connected to a V-phase coil, a W-phase output 524 connected to a W-phase coil, hole sensors 525 to 527, an MR sensor 528, a motor start signal (stop/start signal) 529 outputted from the DSP, a PWM signal 530 outputted from the DSP, and a motor speed detecting MR sensor signal 531. The logic circuit serves to combine the switching signals from the hole sensors 525 to 527 through the hole sensor amplifiers 511 to 513 with the PWM signal from the DSP 501, and the control circuit 509 serves to boost an output signal from the logic circuit 508 to be outputted to the driver 504 as an electric current control signal. There is also provided a serial communication bus 532 for effecting communication with a control CPU (not shown) of the image forming apparatus.

Next, an operation of the motor servo-control circuit will be described. First of all, when a motor drive command is transmitted from the CPU through the serial communication line 532, the pre-driver 503 ascertains the position of the rotor detected by the hole sensors 525 to 527 and determines the switching timing so as to obtain the desired rotation and effects control to give the desired rotational direction and the desired electric current to the motor. Namely, the N-chMOS transistors 515 to 520 are switched to give the desired rotational direction, and the N-chMOS transistors 515, 517, 519 are PWM-switched to cause the desired electric current to flow into the coil of the motor. In this case, the gate voltages of the N-chMOS transistors 515, 517, 519 are increased to Vcc+10V by the charge pump circuit 507.

For example, when the pre-driver 503 ascertains the rotor position of the motor on the basis of the hole sensor signals amplified by the hole sensor amplifiers 511 to 513 and the hole sensors 525 to 527 and switches the direction of the electric current from the U-phase 522 to the W-phase 523 to obtain the desired rotational direction, the pre-driver 503 turns ON the N-chMOS transistors 515, 518 and turns OFF the transistors 516, 517, 519, 520. As a result, an electric current path extends from Vcc to the current detecting resistor 521 through the transistor 515, U-phase output 522, V-phase output 523 and transistor 518, thereby generating a magnetic force in the desired coil. In this case, the PWM signal 530 given by the DSP 501 is composed or combined with the switching signal, so that the N-chMOS transistor 515 is PWM-controlled b the pre-driver 503.

Accordingly, ON-duty electric current defined by the PWM signal flows from the U-phase to the V-phase. In this way, the motor is subjected to exciting switching control for switching the electric current to the U, V, W-phase to rotate the rotor in the desired rotational direction, thereby generating torque by the relative electromagnetic action between the main pole magnet (not shown) and the coil.

When the motor is subjected to the exciting switching control in this way to rotate the rotor, a pre-set MR sensor magnetizing pattern is detected by the MR sensor 528, thereby outputting 360 pulses per one revolution. Namely, a signal having a frequency corresponding to the revolution number of the motor is obtained, and this signal is inputted to the DSP 501 as the MR sensor signal 531 through the amplifier 514.

The DSP 501 measures a pulse interval of the MR sensor signal 531 and seeks the speed (rad/s) of the motor and compares the motor speed with a target control speed (set target speed which can be altered) and performs a PI filter (not shown) and gain added calculation (not shown) to derive a PWM pulse width and sends the pulse width to the pre-driver 503 as the PWM signal 530 to control the current to be supplied to the motor coil, thereby controlling the motor to rotate at the target speed.

In this way, the DSP 501 effects the switching of the output stage N-chMOS transistor by generating the PWM signal and combines it with the switching signals, thereby performing servo-control to rotate the motor at the desired number of revolutions. On the other hand, the position of the main pole is detected by the hole sensors 525 to 527, and the switching control is performed by the pre-driver 503 on the basis of the hole sensor signals 415 to 417 to rotate the rotor in the desired rotational direction. Further, the pre-driver 503 detects the current flowing through the motor by the electric current detecting resistor 521, and, there is provided protecting means for limiting the electric current if the current greater than a predetermined value flows.

Figure 4:
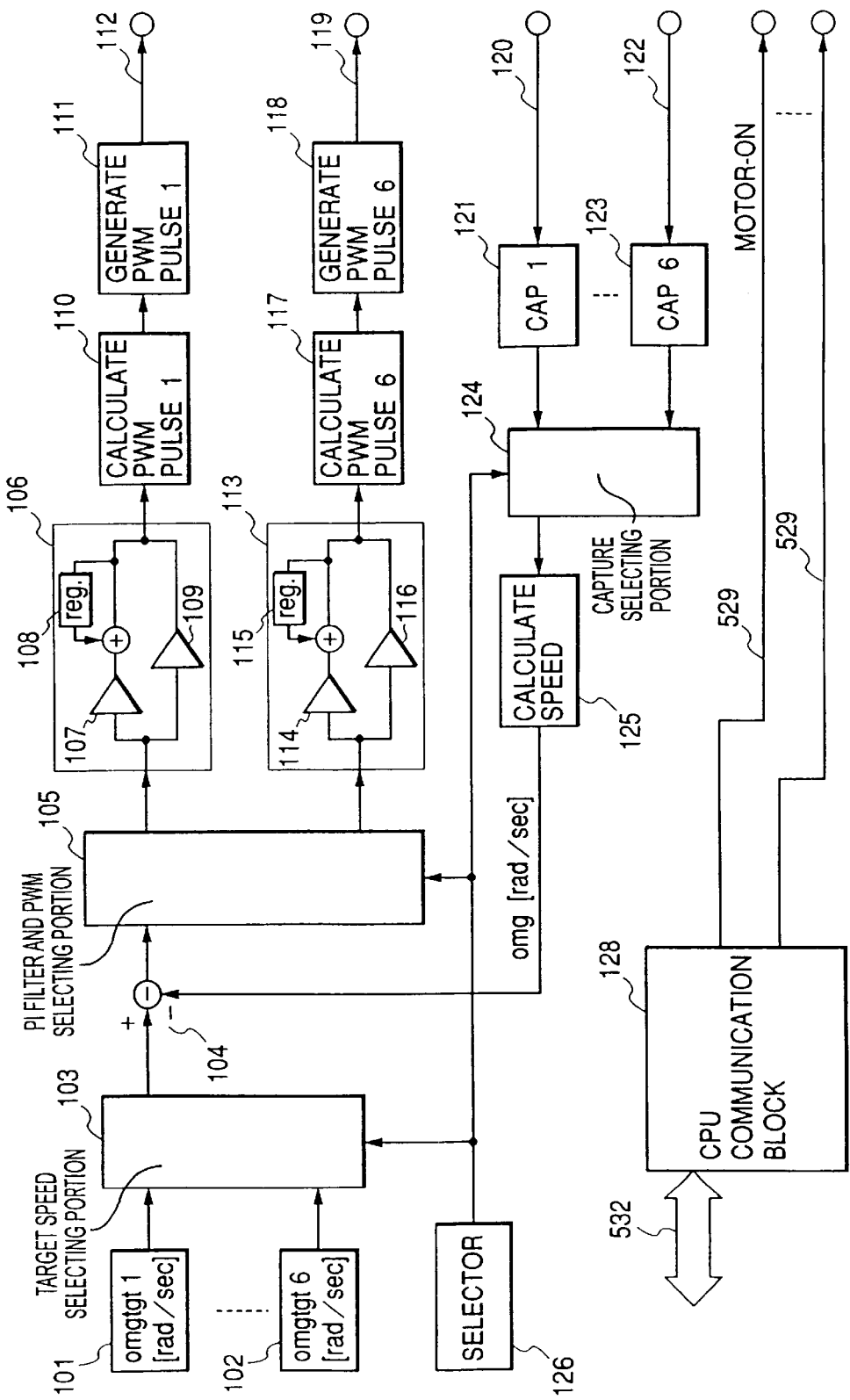
FIG. 4 is a block diagram showing the DSP of FIGS. 1 and 2 concretely.

FIG. 4 shows an internal construction of the DSP 501 concretely. The reference numeral 529 denotes six motor start signals outputted to the respective motor units; 530 denotes six PWM signals outputted to the respective motor units; and 531 denotes six motor speed detecting MR sensor signals inputted from the respective motor units.

In FIG. 4, there are shown target speeds 101, 102 for respective motors, in which independent target speeds (rad/s) are set with respect to six motors $505_1$ to $505_6$; a target speed selecting portion 103 in the servo-control loop; a calculation point 104 for deriving the difference between the target speeds and actual speeds; PI filter and PWM selecting portion 105 in the servo-control loop; a PI filter 106 for the motor $505_1$ including PI filter integration item constant 107 for the motor $505_1$ and a memory portion 108 (of the PI filter for the motor $505_1$) for storing a preceding calculation result and a proportion item constant 109 of the PI filter for the motor $505_1$; a PWM pulse width calculation portion 110 for the motor $505_1$; and a PWM pulse generating portion 111 for the motor $505_1$. The output from the PWM pulse generating portion 111 is the PWM pulse signal 530 for the motor $505_1$.

There are further shown a PI filter 113 for the motor $505_6$ including PI filter integration item constant 114 for the motor $505_6$ and a memory portion 115 (of the PI filter for the motor $505_6$) for storing a preceding calculation result and a proportion item constant 116 of the PI filter for the motor $505_6$; a PWM pulse width calculation portion 117 for the motor $505_6$; and a PWM pulse generating portion 118 for the motor $505_6$ The output from the PWM pulse generating portion 111 is the PWM pulse signal 530 for the motor $505_6$.

In this way, the PI filter, the PWM pulse width calculation portion, the PWM pulse generating portion, and the PWM signal are provided for each of the motors $505_1$ to $505_6$.

Further, as the motor speed detecting MR sensor signal 531, 360 pulses per one revolution of the motor are inputted. A capture 121 serves to count the pulse obtained by the motor $505_1$ from edge to edge by a predetermined timer, and a capture 123 serves to count the pulse obtained by the motor $505_6$ from edge to edge by a predetermined timer. In this way, the pulse signals are given from the respective motors $505_1$ to $505_6$, and the capture is provided for each of the motors. The reference numeral 124 denotes a capture selecting portion; 125 denotes a speed calculating portion; and 126 denotes a selector. A CPU communication block 128 serves to output motor start signals 529, and a serial communication bus 532 serves to effect communication with a control CPU (now shown) of the image forming apparatus.

Next, an operation will be explained.

First of all, the program of the DSP controls the control loop to cause the selector 126 to select a motor to be controlled so that such controls are not interfered with. For example, when six motors are controlled with the same control loop of 1 kHz, if all of the motors are controlled at the same timing, interference will occur. To avoid this, the phases of the control loops of 1 kHz are deviated from each other.

When the control of the motor $505_1$ is selected by the selector 126, a target speed 101 of the motor $505_1$ is selected, and the selected speed is compared with the speed of the motor $505_1$ at the calculation point 104. The speed of the motor $505_1$ to be compared is sought by inputting the pulses (360 pulses per one revolution) generated by the rotation of the motor $505_1$ to the capture 121 through the pulse signal line 120, by selecting it in the capture selecting portion 124, and by calculating the speed in the speed calculation portion 125.

A compared result obtained at the calculation point 104 is inputted to the PWM selecting portion 105, where the PI filter 106 for motor 1 is selected and PI calculation is effected. The PI calculation is effected by adding a result obtained by multiplying the speed difference (sought at the calculation point 104) by the proportion item constant 109 to a result obtained by adding the preceding calculation result (stored in the memory portion 108) to a result obtained by multiplying the speed difference by the integration item 107. The proportion constant 109 and the integration constant 107 (which constitute PI filter constant) are referred to as the servo constant and are previously set on the basis of the specification of the motor, and the load inertia and the torque condition of the motor.

A calculated result in the PI filter 106 is converted into a PWM pulse width in the PWM pulse width calculating portion 110, and the PWM pulse is generated in the PWM pulse generating portion 111. In the PWM pulse generating portion, the PWM pulse having the width sought in the PWM pulse calculating portion 111 is overlapped with pre-set PWM carrier frequency.

For example, when it is defined that the pre-set PWM carrier frequency is 20 kHz (50 $\mu$s) and the PWM pulse width is 8 bits, if the PWM pulse calculation result is "66"H, the PWM pulse width will be 20 $\mu$s (=50 $\mu$s×"66"H/"FF"H), with the result that the PWM pulse signal 530 of 40% (regarding carrier frequency of 20 kHz) is outputted. The pulse width is renewed whenever the calculated result is obtained in the PWM pulse calculating portion 110. Namely, if the PWM calculation is effected with a period of 1 kHz, the PWM pulse width will be changed every 1 kHz period.

As mentioned above, similar to the generation of the PWM pulse for the motor $505_1$, regarding each of the motors $505_2$ to $505_6$, a PWM pulse is generated on the basis of a corresponding PI filter constant and PWM carrier frequency. The PI filter constant and PWM carrier frequency are previously set in accordance with the specification of the motor and the driving load condition.

On the other hand, the speed of each of the motors $505_1$ to $505_6$ selected by the selector 126 is calculated by selecting the corresponding capture in the capture selecting portion 124 and by reading-in the value of the selected capture and by effecting calculation in the speed calculating portion 125.

For example, in a case where the capture 121 is 16 bits and clock is 50 ns and pulse signal 120 outputted by the motor $505_1$ has 360 pulses per one revolution, regarding the speed of the motor $505_1$, when the value of the capture 121 is "1234"H, the interval between the pulse signal 120 becomes 233 $\mu$s (="1234"H×50 ns) and the speed of the motor $505_1$ becomes 74.9 rad/s (=($2\pi$/360)/233 $\mu$s).

Figure 5:
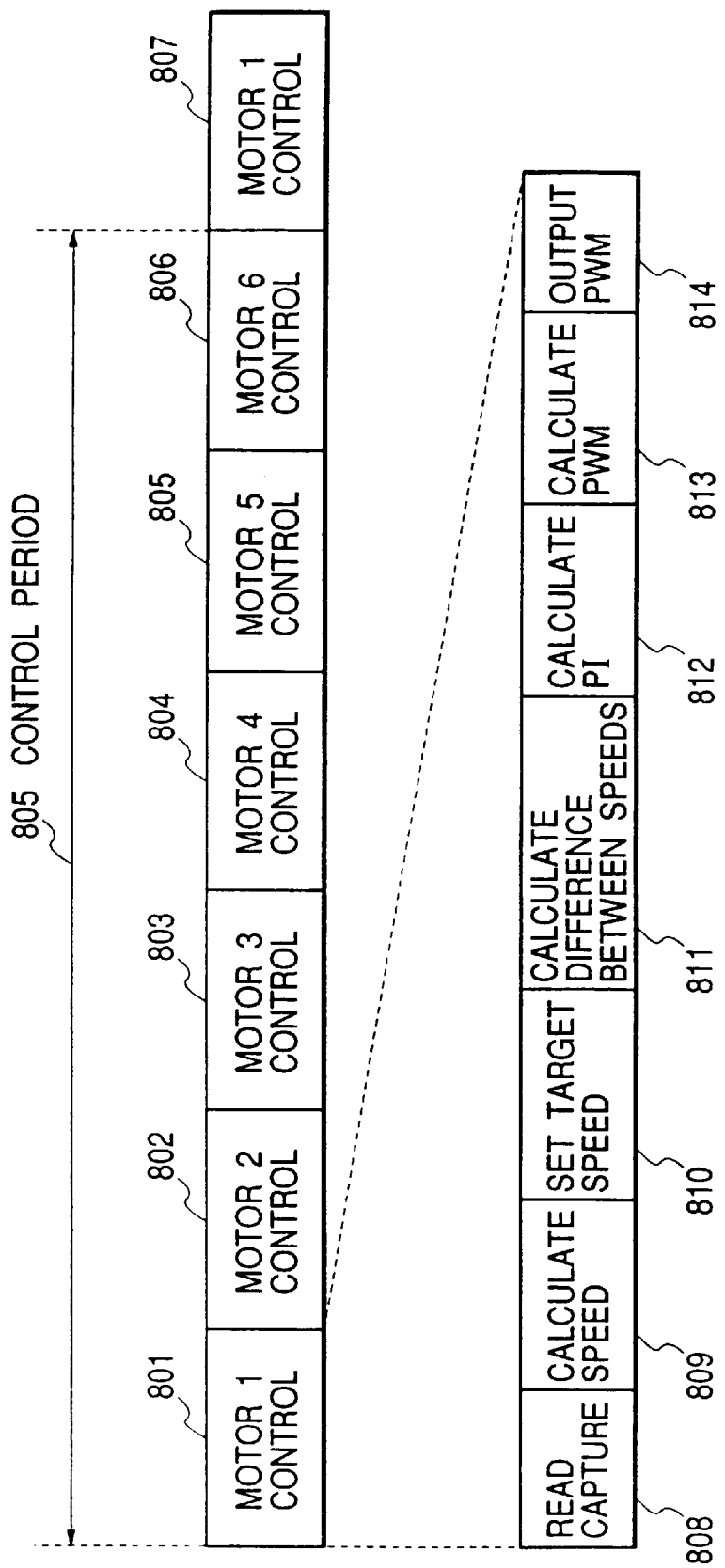
FIG. 5 is a view showing control of the plural motors of FIG. 4 in a time-lapse relation.

Next, an operation of the selector 126 will be explained with reference to FIG. 5. FIG. 5 is a view showing the control of the motors $505_1$ to $505_6$ in a time-lapse relation. Blocks 801 to 806 indicate control periods of the motors $505_1$ to $505_6$, a block 807 indicates a control period of the motor $505_1$, a block 808 indicates the reading of capture in the control of the motor $505_1$, a block 809 indicates the calculation of speed, a block 810 indicates the setting of target speed, a block 811 indicates the calculation of the difference between speeds, a block 812 indicates the calculation of PI, a block 813 indicates the calculation of PWM, a block 814 indicates the outputting of PWM, and the reference numeral 815 indicates a servo-control period of the motor $505_1$.

Also regarding the motors $505_2$ to $505_6$, control similar to the blocks 808 to 814 is performed. The servo-control period 815 of the motor $505_1$ is determined by a response property of the motor $505_1$. Similarly, the motors $505_2$ to $505_6$ are controlled with optimum servo-control periods in consideration of the response properties of the motors. In this case, the servo control periods are controlled by the selector so that the servo-control periods do not interfere with each other.

For example, when the servo-control periods of the motors $505_1$ to $505_6$ are all 1 kHz (1 ms), the control start timing of the motor $505_1$ is deviated from the control start timing of the motor $505_2$ by about 166 $\mu$s (=1 ms/6). Similarly, deviation between the control start timing of the motor $505_2$ and the control start timing of the motor $505_3$, deviation between the control start timing of the motor 5053 and the control start timing of the motor $505_4$, deviation between the control start timing of the motor $505_4$ and the control start timing of the motor $505_5$, deviation between the control start timing of the motor $505_5$ and the control start timing of the motor $505_6$ are selected to be about 166 $\mu$s.

On the basis of the servo-control period determined for each motor control, the capture of the motor to be controlled is read, the speed is calculated, the target speed of the motor to be controlled is set, the difference between the target speed and the actual speed is calculated, a calculated result is subjected to PI calculation with the PI filter constant for the motor to be controlled, PWM calculation is effected, and the PWM is outputted. Namely, servo-control loops for the respective motors are formed so that they do not interfere with each other, and, the target speeds and PI filter constants (servo constants) inherent to the respective motors are selected, and the respective PWM pulse controls are effected.

Next, the motor control operation will be explained.

First of all, for example, when the fixing motor driving command is transmitted from the CPU through the serial communication bus 532, the DSP 501 causes the pre-driver 503 to make the motor start signal 529 active and causes the PWM signal 530 to generate a PWM pulse having an ON-duty of 80%, thereby driving the motor.

When the motor start signal 529 is received, the pre-driver 503 effects the exciting switching control of the N-chMOS transistors 515 to 520 (in the logic circuit 508) on the basis of the position of the rotor detected by the hole sensors 525 to 527 so that the motor is rotated in the predetermined rotational direction, and, when the PWM signal 530 is received, the pre-driver PWM-switches the N-chMOS transistors 515, 517, 519. In this case, the control circuit 509 increases the gate voltages for the N-chMOS transistors 515, 517, 519 to Vcc+10V through the charge pump circuit 507.

For example, when the logic circuit 508 ascertains the position of the rotor of the motor on the basis of the result amplified by the hole sensor amplifiers 511 to 513 and the result sensed by the hole sensors 525 to 527 to switch the electric current direction from the U-phase 522 to the V-phase 523 thereby to obtain the desired rotational direction, the N-chMOS transistors 515, 518 are turned On and the N-chMOS transistors 516, 517, 519, 520 are turned OFF. As a result, the electric current path extends from Vcc to the electric current detecting resistor 521 through the N-chMOS transistor 515, U-phase output 522, W-phase output 523 and N-chMOS transistor 518, thereby generating a magnetic force in the predetermined coil.

In this case, the N-chMOS transistor 515 is PWM controlled by the PWM signal 530 given by the DSP 501 and passing through the logic circuit 508 and control circuit 509. Accordingly, the ON-duty electric current defined by the PWM signal 530 flows from the U-phase to the V-phase. In this way, the exciting switching control for switching the electric current to the U-phase and V-phase is effected so that the motor is rotated in the predetermined direction, thereby generating torque by the relative electromagnetic action between the main pole magnet (not shown) and the coil.

When the motor is subjected to the exciting switching control to rotate the rotor in this way, the pre-set MR sensor magnetized pattern is detected by the MR sensor 528, and 360 pulses per one revolution are outputted. Namely, the signal having a frequency corresponding to the revolution number of the motor is obtained, and this signal is sent to the DSP 501 through the amplifier 514 and the MR sensor signal line 531.

The program of the DSP 501 measures the pulse interval between the pulses from the MR sensor signal line 531 and seeks the speed (rad/s) of the motor and compares the motor speed with the target control speed and performs a PI filter calculation (not shown) and a gain addition calculation (not shown) to derive the PWM pulse width and sends the pulse width to the pre-driver through the PWM signal line 530 to control the current to be supplied to the motor, thereby controlling the motor to rotate at the target speed.

In this way, the DSP 501 effects the switching of the output stage N-chmos transistor by using the PWM signal 530, thereby performing the servo-control to rotate the motor at the desired number of revolutions. On the other hand, the pre-driver 503 performs the exciting control on the basis of the position of the main pole detected by the hole sensors 525 to 527 to rotate the rotor in the desired rotational direction and drives the N-chMOS transistor. Further, the pre-driver detects the current flowing through the motor by the electric current detecting resistor 521, and, there is provided protecting means for limiting the electric current by the current limiter circuit 510 if the current greater than a predetermined value flows.

As mentioned above, according to the illustrated embodiment, in order that the six motors of the image forming apparatus are subjected to software servo-control by the single DSP so as to control the motors by using the servo constants pre-set in accordance with various conditions regarding the control revolution number, the inertia, the torque constant, the coil specification and the driving load of each motor without interfering the independent servo-control loops of the motors with each other, there is provided the selector means by which the timings of servo-control loops of the motors are governed, and the control loop of each motor regarding the target speed, the speed detection, the PI filter calculation, the PWM calculation and the PWM pulse output is controlled.

As a result, particularly in an image forming apparatus which has a plurality of servo motors and in which a driving load condition is changed within a wide range, stable servo-control can always be realized, thereby obtaining good image quality.

Further, since the servo-control can be performed efficiently under the concentrated control of a single DSP, the cost of the image forming apparatus can be reduced.

Figure 6:
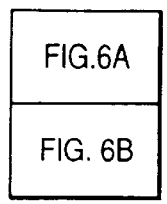
FIG. 6, which is comprised of FIGS. 6A and 6B, is a flow chart showing a motor control program of the DSP including servo-constant calculation control.
Figure 6A:
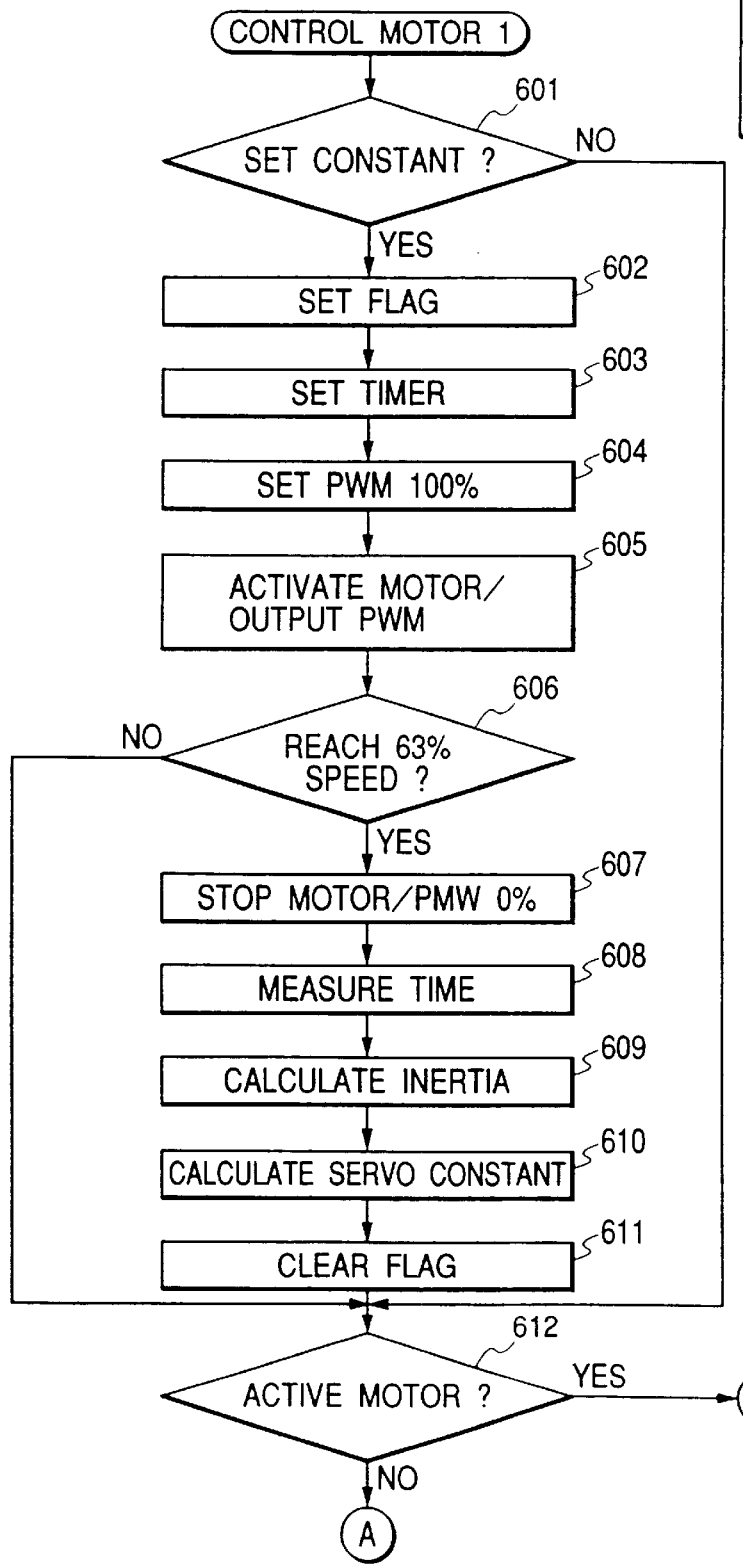
Figure 6B:
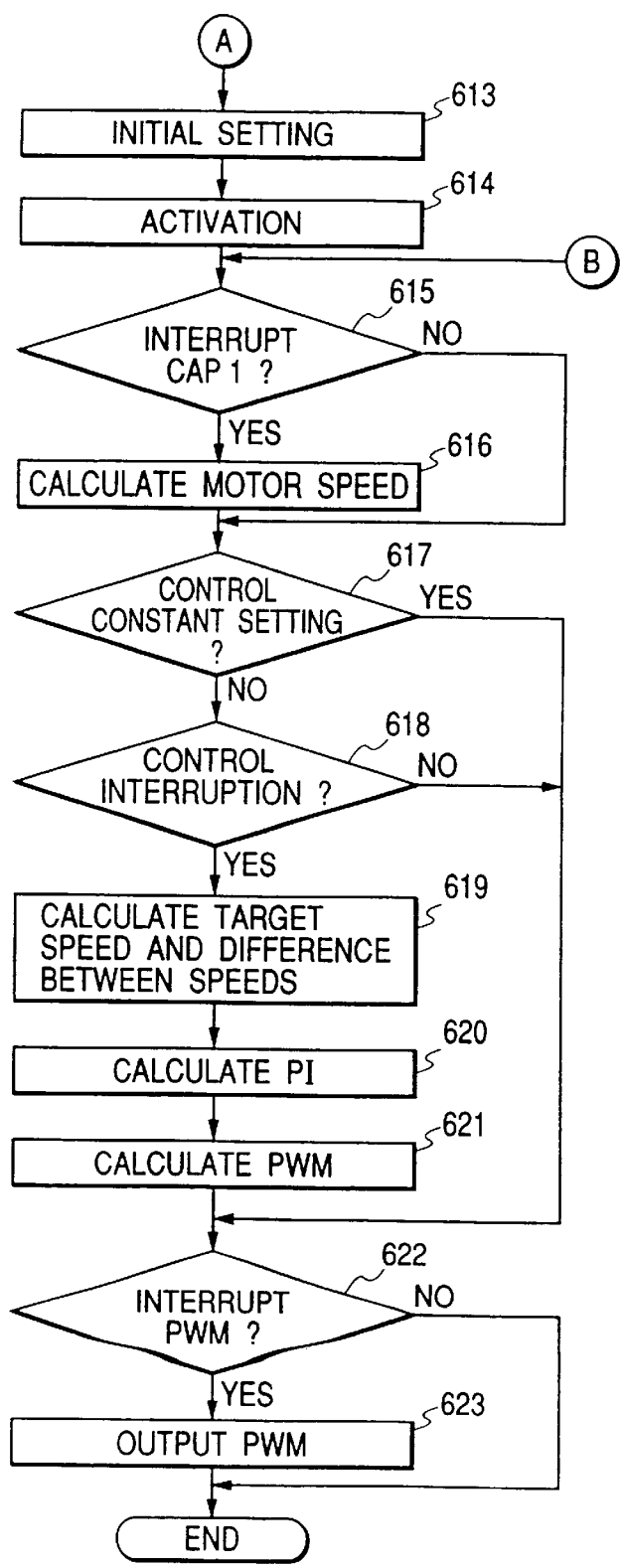

FIG. 6 is a flow chart of the motor control program of the DSP including servo constant calculation control, regarding only the motor $505_1$.

First of all, in a step S601, it is judged whether there is a command for determining the servo constant of the motor $505_1$ from the control CPU (not shown) of the image forming apparatus. The CPU of the image forming forming apparatus sends such command to the DSP in a time period in which the motor driving is not required, other than image forming period. The CPU of the image forming apparatus sends such command to the DSP in a time period in which the motor driving is not required, other than the image forming period.

In the step S601, if there is the servo constant setting command, in a step S602, a servo constant setting control flag is set, and, in a step S603, a timer is set. Then, in a step S604, PWM ON-duty is set to 100%, and, in a step S605, the motor driving signal is made active. Then, in a step S606, it is judged whether the motor speed reaches 63%.

In the step S606, if the motor speed does not reach 63%, the program is jumped and the speed detection and PWM output control are effected. As a result, the motor starts to rotate with an open loop. On the other hand, in the step S606, if the motor speed reaches 63%, in a step S607, the motor is stopped and the PWM ON duty is made 0%, and, in a step S608, the time is measured on the basis of the previously driven timer. Namely, after the motor is driven with the open loop, a time period until the motor speed reaches 63% is measured.

Then, in a step S609, the inertia is sought. Now, the calculation of the inertia will be described.

The transmission function of the motor can be equivalent to a primary delay system model, and gain G is represented by the following equation (1):

$$G=K/(1+sT) \qquad (1)$$

Where, K=1/Ke, and Ke is the reverse start constant. Further, $$T=RJ/(K t \times Ke) \qquad (2)$$

Where, R is the coil resistance of the motor, J is the load inertia and K is the torque constant of the motor.

Further, the response property of the motor is represented by the following equation (3) on the basis of the above equation (1):

$$h(t)=K/(1-et/T) \qquad (3)$$

From the equation (3), when t=T, $h(t) \propto 0.632 \times K$.

Namely, by seeking the time when the speed reaches 63.2% after the motor was started, from J=(Ke×Kt×t)/R (alteration from the above equation (2)), J can be sought, since R, Kt and Ke of the motor are already known.

Then, in a step S610, the servo constant is calculated. In this calculation, the 0 dB intersecting point of the open loop property of the motor is sought by ω=1/T from the above equations (1) and (2) by using the previously sought inertia J, and, an inflection point of the PI filter is set with respect to the intersecting point, and the PI filter constant (proportion item constant and integration item constant shown in FIG. 4) is sought.

Then, in a step S611, the servo constant setting flag is cleared, and the servo constant setting sequence is finished. In a step S612, it is judged whether the motor has already been driven. If not driven, in a step S613, initial setting of resistors, timers and ports is effected, and, in a step S614, the motor is driven. On the other hand, if the motor has already been driven, the program is jumped.

Then, in a step S615, it is judged whether there is CAP1 interruption. If there is the interruption, in a step S616, the motor speed is calculated. This interruption is generated whenever the rising edge of the pulse is reached from the MR sensor. On the other hand, if there is no interruption, the program is bypassed.

Then, in a step S617, it is judged whether there is the servo constant setting control flag. If there is no servo constant setting control flag, in a step S618, it is judged whether there is servo-control loop interruption. If there is control interruption, in a step S619, the difference between the target speed and the actual speed is calculated, and, in a step 5620, PI filter calculation is effected by using the previously sought constant, and, in a step S621, the PWM width is set.

On the other hand, in the step S617, if under the servo constant setting control, in a step S618, the program bypasses the steps S619 to S621 (PWM width calculating sequence). Further, in the step S618, if there is no servo-control interruption, the PWM width calculating sequence is bypassed.

Then, in a step S622, it is judged whether there is a PWM interruption. If there is an interruption, in a step S623, the pulses are outputted to the port; whereas, if there is no interruption, the pulses are not outputted. The PWM interruption is generated at carrier frequency pre-set. For example, when the carrier frequency is 20 kHz, interruption of 20 kHz is generated.

Whenever this interruption is generated, if the PWM pulse having the width sought by calculation is outputted, the PWM pulse having carrier of 20 kHz can be formed.

In this way, according to the illustrated embodiment, there is provided a leaning sequence in which the motor servo constant setting period is given by the control CPU of the image forming apparatus in the time period other than the image forming period, and, in this period, the DSP calculates the load inertia of the motor, and the servo constant is sought on the basis of the inertia. With this arrangement, for example, even in a system in which the load inertia is greatly changed in accordance with the difference in toner capacity of the toner cartridge or the difference in the kind of the cartridge, the proper servo constant can be used, with the result that the control is stabilized and good image quality can be obtained.

Figure 7A:
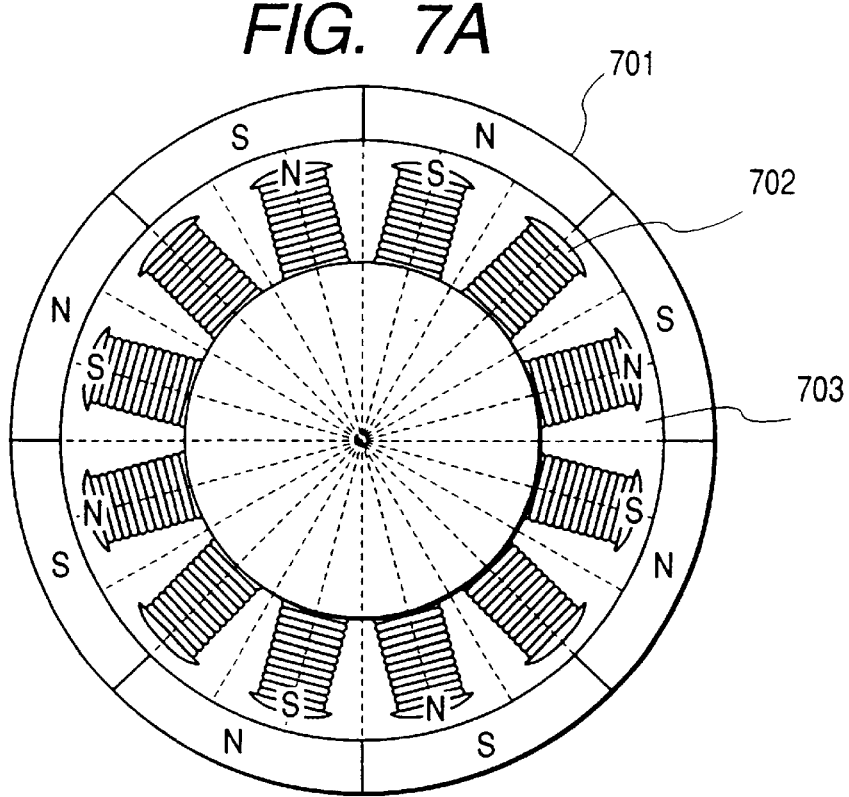
FIG. 7A is a view showing a brushless motor of the outer-rotor type as a reference.
Figure 7B:
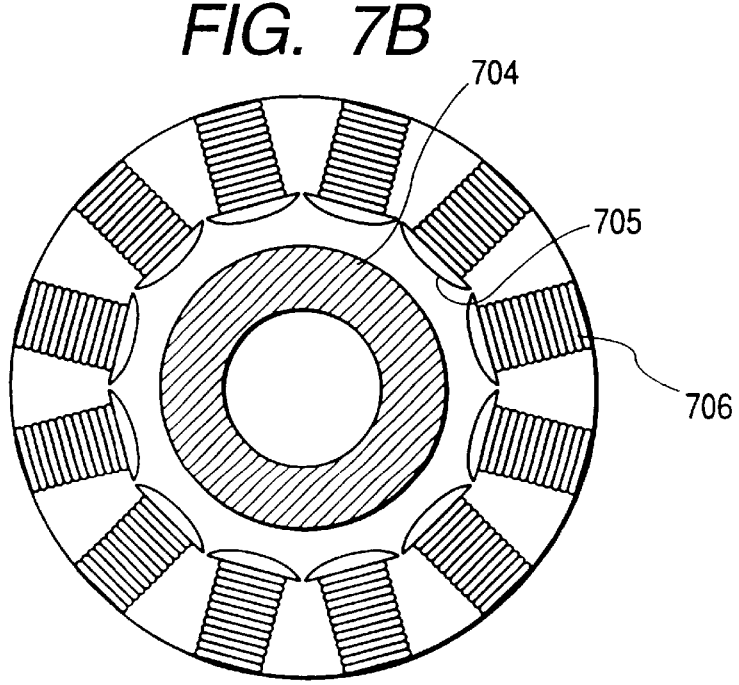
FIG. 7B is a view showing a brushless motor of the inner-rotor type used in the present invention.

FIGS. 7A and 7B are views showing a DC brushless motor of the inner-rotor type used in the present invention and a brushless motor of the outer-rotor type. In FIG. 7A, a DC brushless motor of the outer-rotor type comprises a rotor 701, stators 702 and windings or coils 703. On the other hand, in FIG. 7B, a DC brushless motor of the inner-rotor type comprises a rotor 704, stators 705 and windings or coils 706. As can be seen from the drawings, the motor of the inner-rotor type has smaller rotor which leads to a small inertia.

Namely, since the inertia is small, the mechanical response of the motor becomes fast accordingly, with the result that the frequency of the servo-control loop in the servo-control block diagram of FIG. 4 can be hastened. That is to say, in a system having relatively great load fluctuation frequency, by hastening the frequency of the servo-control loop, the fluctuation suppressing effect due to servo can be enhanced.

In this way, in the illustrated embodiment, by using the above-mentioned motor servo-control and by using the DC brushless motor of the inner rotor type having a small inertia, the present invention is effective in a system in which rotational fluctuation of the motor due to load fluctuation is generated at a relatively high frequency.

Figure 8:
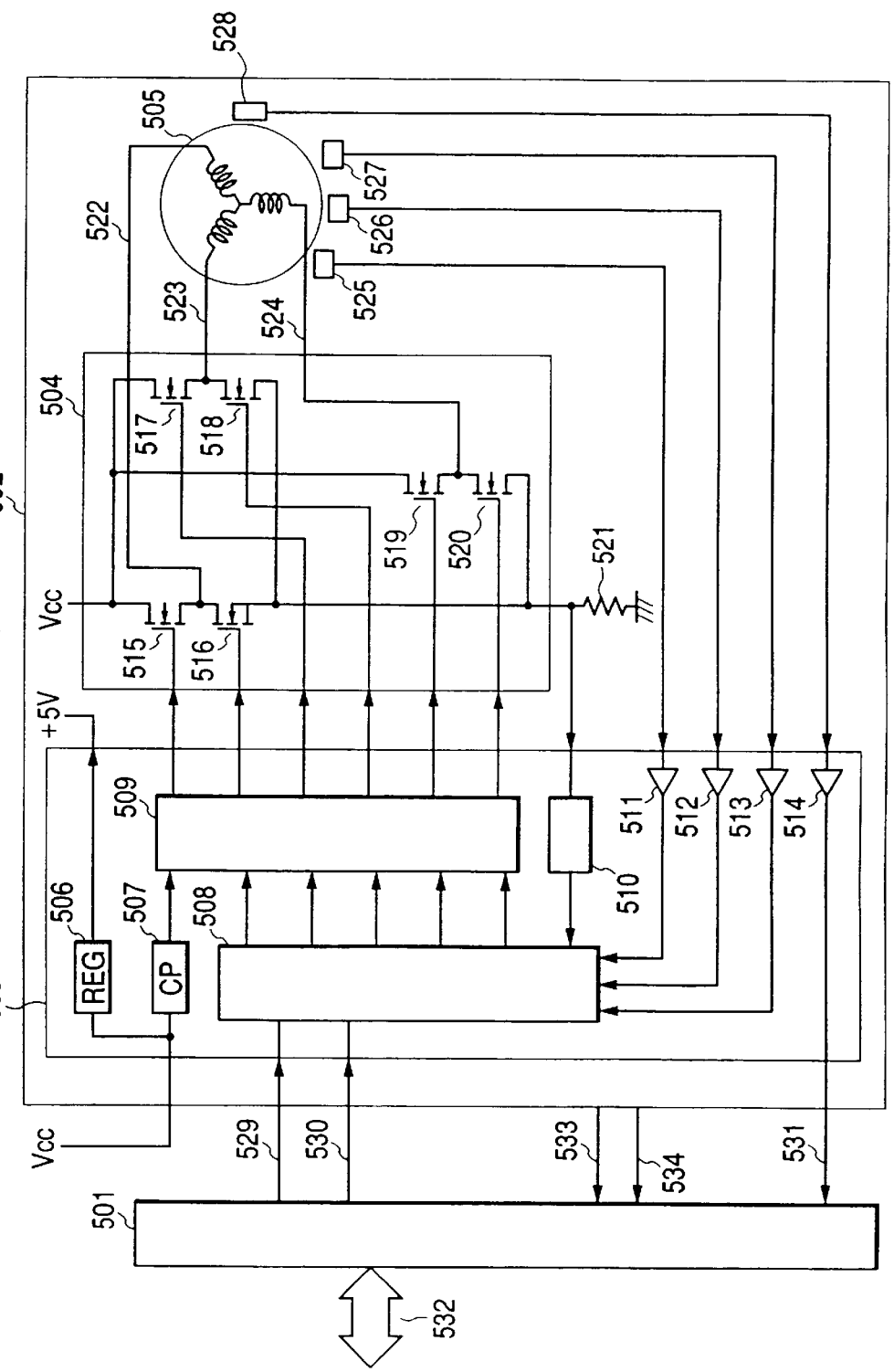
FIG. 8 is a block circuit diagram showing a first alteration of the internal circuitry of the motor unit shown in FIG. 3.

FIG. 8 shows a first alteration of the internal circuitry of the motor unit shown in FIG. 3. In this alteration, the servo constant is determined in accordance with the kind of the motor. The same elements as those in the embodiment shown in FIG. 3 are designated by the same reference numerals and an explanation thereof will be omitted.

In FIG. 8, the reference numerals 533, 534 indicate discrimination signals of the motor unit. In this alteration, discrimination signal lines (discrimination signals 533, 534 for the motor) are provided in association with the servo-control apparatus. The DSP 501 determines the servo constant on the basis of the motor discrimination signals 533, 534.

For example, when it is assumed that the outer rotor motor is designated if the motor discrimination signals 533, 534 are "0", "1", respectively, and the inner rotor motor is designated if the motor discrimination signals 533, 534 are "1", "1", respectively, the DSP 501 selects the corresponding servo constant from the servo constant table previously stored for the respective motors and effects servo-control. By discriminating the motor type on the basis of the motor discrimination signals 533, 534 and by selecting and using the optimum servo constant for the motor, stable motor servo-control can be realized.

Then, in a step 403, the servo constant corresponding to the result of the discrimination signals is derived from the lookup table. The lookup table is previously stored in a memory (not shown) of the DSP. Further, the servo constant indicates constants of the proportion item and the integration item of the PI filter and a constant of gain.

Next, the motor servo-control effected by the DSP 501 will be explained.

Figure 9:
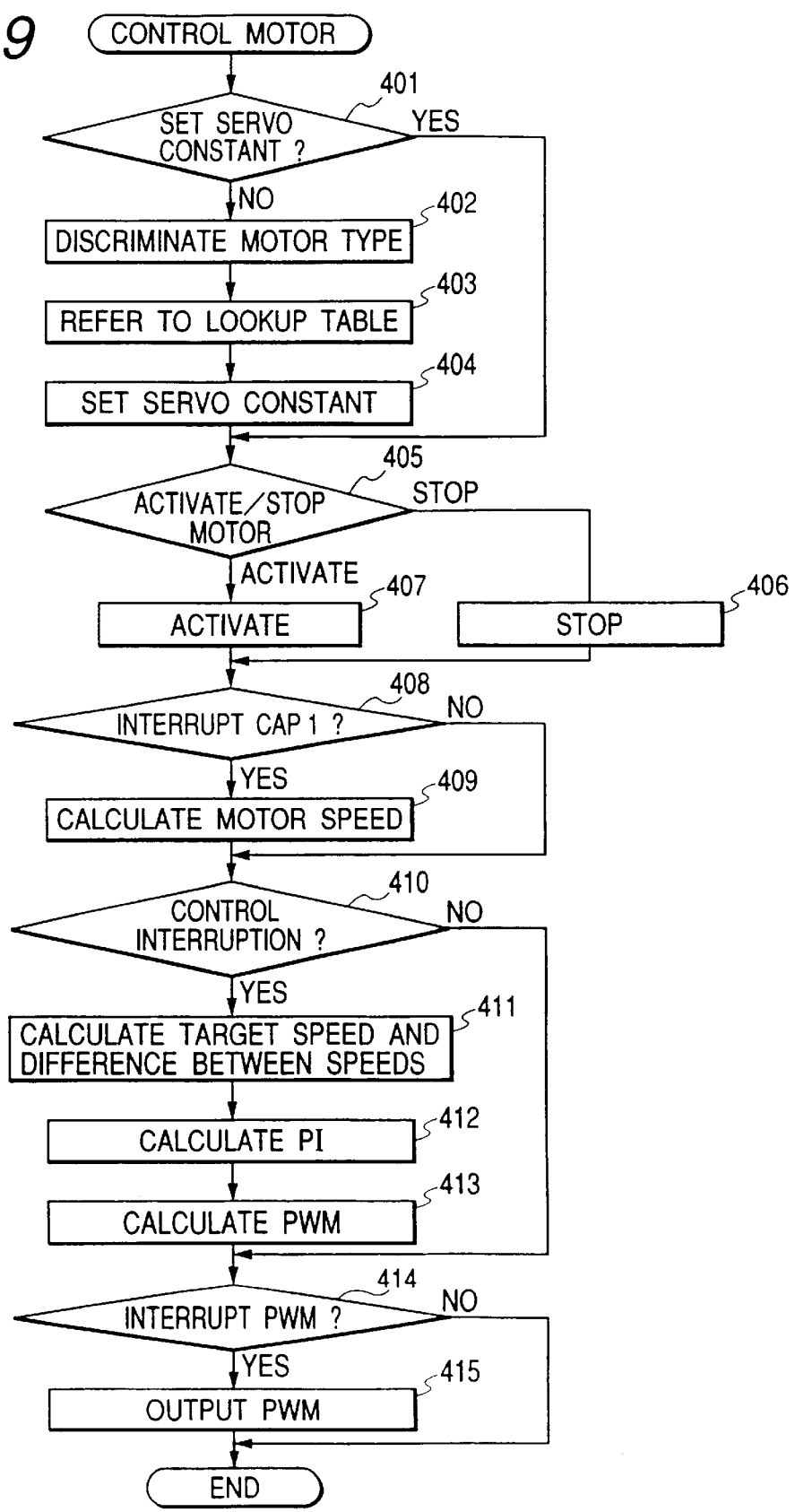
FIG. 9 is a flow chart of the DSP shown in FIG. 8.

FIG. 9 is a flow chart showing a servo-control routine of the DSP 501 shown in FIG. 8.

First of all, in a step 401, it is judged whether the servo constant is set. If No, in a step 402, the motor type is discriminated. This discrimination is effected by using the motor discrimination signals 533, 534 shown in FIG. 8.

Then, in a step 403, the servo constant corresponding to the result of the discrimination signals is derived from the lookup table. The lookup table is previously stored in a memory (not shown) of the DSP. Further, the servo constant indicates constants of the proportion item and the integration item of the PI filter and a constant of gain.

Then, in a step 404, the derived servo constant is set in a calculation formula.

On the other hand, in the step 404, after the servo constant was set once, when the servo-control routine is carried out again, in the step 401, it is judged that the servo constant has already been set, and the routine jumps to a step 405.

Then, in steps 405 to 407, it is judged whether the motor is started or stopped.

In a control task (not shown), when a motor start flag or a motor stop flag is set and the servo-control routine is carried out, in the step 405, the flag is checked. If it is judged that the motor should be started in the step 405, the motor drive signal 529 is made active, and, in the step 407, the predetermined PWM value is given, thereby accelerating the motor. On the other hand, if it is judged that the motor should be stopped in the step 405, in the step 406, the motor drive signal 529 is made disable to make the PWM signal zero, thereby stopping the motor.

Then, in a step 408, it is judged whether there is an interruption of capture. The capture circuit (not shown) is designed so that, whenever the rising edge of the pulse of the MR sensor signal 331 shown in FIG. 8 is reached, such capture interruption is generated.

In the step 408, if there is the interruption of capture, in a step 409, the interval between the interruptions is measured to derive the number of revolutions of the motor. For example, when it is assumed that 300 MR sensor pulses are generated per one revolution and the pulse interval is t (s), the rotational speed of the motor becomes (π/300÷t) rad/s. On the other hand, in the step 408, if there is no capture interruption, the motor speed is not calculated.

Then, in a step 410, it is judged whether there is control interruption. It is designed so that, when the servo-control loop effects the control with 1 kHz, interruption of 1 kHz is generated. If the interruption is generated, in a step 411, the pre-set target speed with the actual speed detected by the capture, and a result is PI- calculated in a step 412. The proportion item constant, integration item constant and gain constant set in the step 404 are calculated, and a result is PWM-calculated in a step 413, thereby deriving the PWM width. As a result, the desired PWM widths are outputted at an interval of 1 kHz. Namely, the servo-control loop having a control frequency of 1 kHz can be realized.

Then, in a step 414, it is judged whether there is PWM interruption.

This interruption is generated every 20 kHz by a pre-designed PWM circuit (not shown).

In the step 414, if the PWM interruption is detected, in a step 415, the pulses having PWM width previously sought in the step 413 are outputted. On the other hand, if the PWM interruption is not detected, the PWM output is not effected. In this way, the PWM pulse having carrier frequency of 20 kHz can be outputted.

As mentioned above, in the first alteration, the motor type is discriminated by the type discrimination signals provided in each motor unit, and, on the basis of this, the servo constant corresponding to the motor type is derived from the table, and the servo-control is performed by using this servo constant.

In this way, the present invention can be realized with a simple construction.

Next, a circuit operation of this motor servo-control circuit will be explained. First of all, when the motor drive command is transmitted from the CPU through the serial communication line 532, the pre-driver 503 ascertains the position of the rotor detected by the hole sensors 525 to 527 and determines the switching timing to obtain the desired rotation and effect control so as to obtain the desired rotational direction and to cause the desired electric current to flow into the motor coil.

Namely, the switching control of the N-chMOS transistors 515 to 520 is effected to obtain the desired rotational direction, and the N-chMOS transistors 515, 517, 519 are PWM-switched to cause the desired current to flow into the coil. In this case, the gate voltages for the N-chMOS transistors 515, 517, 519 are increased to Vcc+10V by the charge pump circuit 507.

For example, when the pre-driver 503 ascertains the position of the rotor of the motor on the basis of the hole sensor signals amplified by the hole sensor amplifiers 511 to 513 and the hole sensors 525 to 527 and switches the electric current direction from the U-phase 522 to the W-phase 523 to obtain the desired rotational direction, the pre-driver 503 turns ON the N-chMOS transistors 515, 518 and turns OFF the N-chMOS transistors 516, 517, 519, 520. As a result, the electric current path extends from Vcc to the electric current detecting resistor 521 through the transistor 515, U-phase output 522, V-phase output 523 and transistor 518, thereby generating a magnetic force in the predetermined coil. In this case, the PWM signal 530 given by the DSP 501 is combined with the switching signals, and the N-chMOS transistors 515 is PWM-controlled by the pre-driver 503.

Accordingly, the ON-duty electric current defined by the PWM signal flows from the U-phase to the V-phase. In this way, the exciting switching control for switching the electric current to the U-phase, V-phase and W-phase is effected so that the motor is rotated in the predetermined direction, thereby generating torque by relative electromagnetic action between the main pole magnet (not shown) and the coil.

When the motor is subjected to the exciting switching control to rotate the rotor in this way, the pre-set MR sensor magnetized pattern is detected by the MR sensor 528, and 360 pulses per one revolution are outputted. Namely, the signal having frequency corresponding to the revolution number of the motor is obtained, and this signal is sent to the DSP 501 through the amplifier 514 and the MR sensor signal 531.

The DSP 501 measures the pulse interval between the pulses from the MR sensor signal line 531 and seeks the speed (rad/s) of the motor and compares the motor speed with the target control speed (set target speed which can be altered) and performs PI filter calculation (not shown) and gain addition calculation (not shown) to derive the PWM pulse width and sends the pulse width to the pre-driver 503 as the PWm signal 530 to control the current to be supplied to the motor, thereby controlling the motor to rotate at the target speed.

In this way, the DSP 501 generates the PWM signal and effects the switching of the output stage N-chMOS transistor by combining the PWM signal with the switching signals, thereby performing the servo-control to rotate the motor at the desired number of revolutions. On the other hand, the position of the main pole is detected by the hole sensors 525 to 527, and the pre-driver 503 performs the switching control by using the hole sensor signals to rotate the rotor in the desired rotational direction. Further, the pre-driver 503 detects the current flowing through the motor by the electric current detecting resistor 521, and, there is provided protecting means for limiting the electric current by the current limiter circuit 510 if the current greater than a predetermined value flows.

Figure 10:
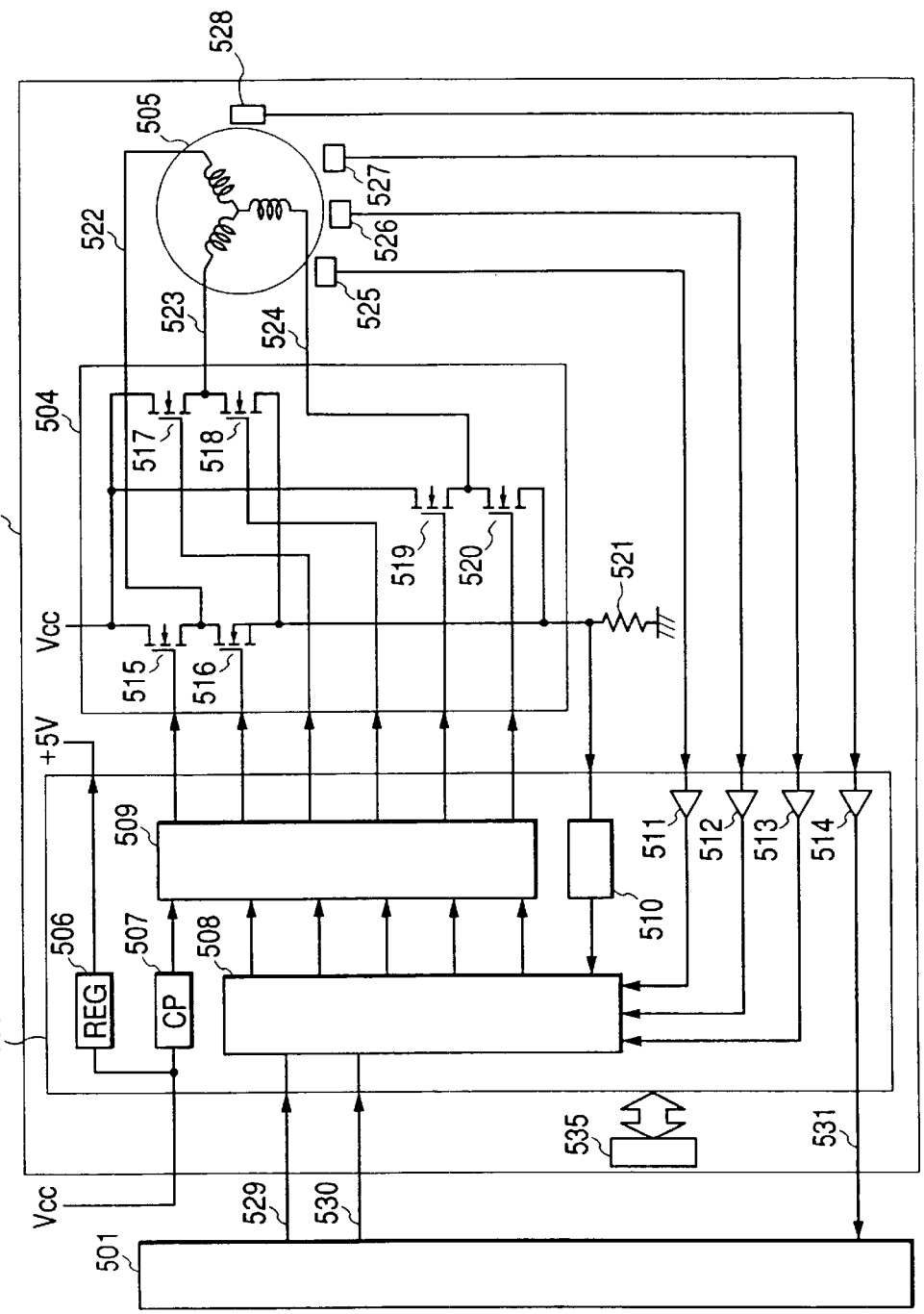
FIG. 10 is a block circuit diagram showing a second alteration of the internal circuitry of the motor unit shown in FIG. 3.

FIG. 10 shows a second alteration of the internal circuitry of the motor unit shown in FIG. 3. The same elements as those in the embodiment shown in FIG. 3 are designated by the same reference numerals and an explanation thereof will be omitted.

The second alteration shown in FIG. 10 differs from the first alteration shown in FIG. 8 in the point that, in place of the motor discrimination signals 533, 534, a memory 535 is provided in a motor unit 502, and the DSP 501 and the motor unit 502 effect communication through serial communication.

An operation will be explained with reference to FIG. 11.

Figure 11:
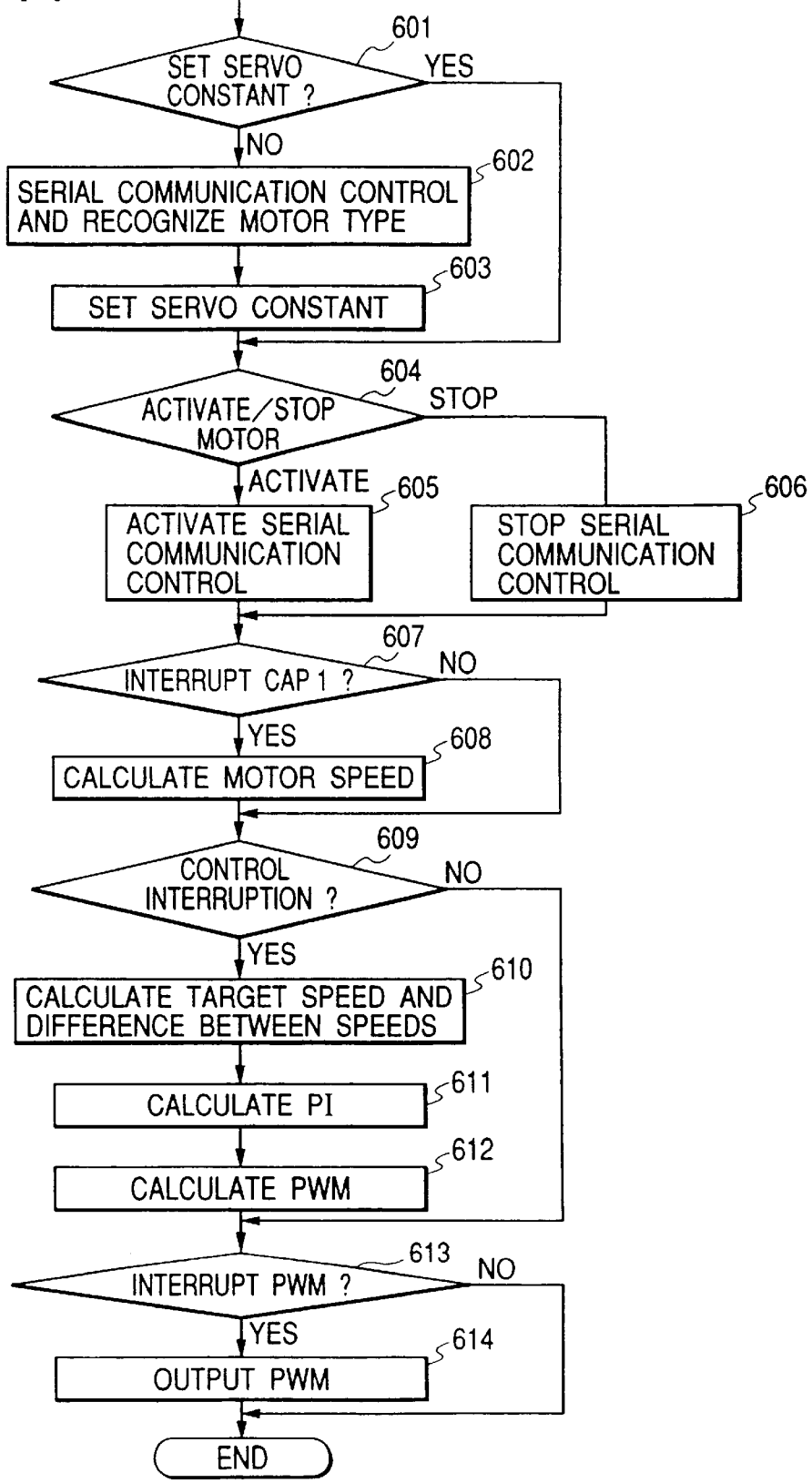
FIG. 11 is a flow chart of the DSP shown in FIG. 10.
Figure 12:
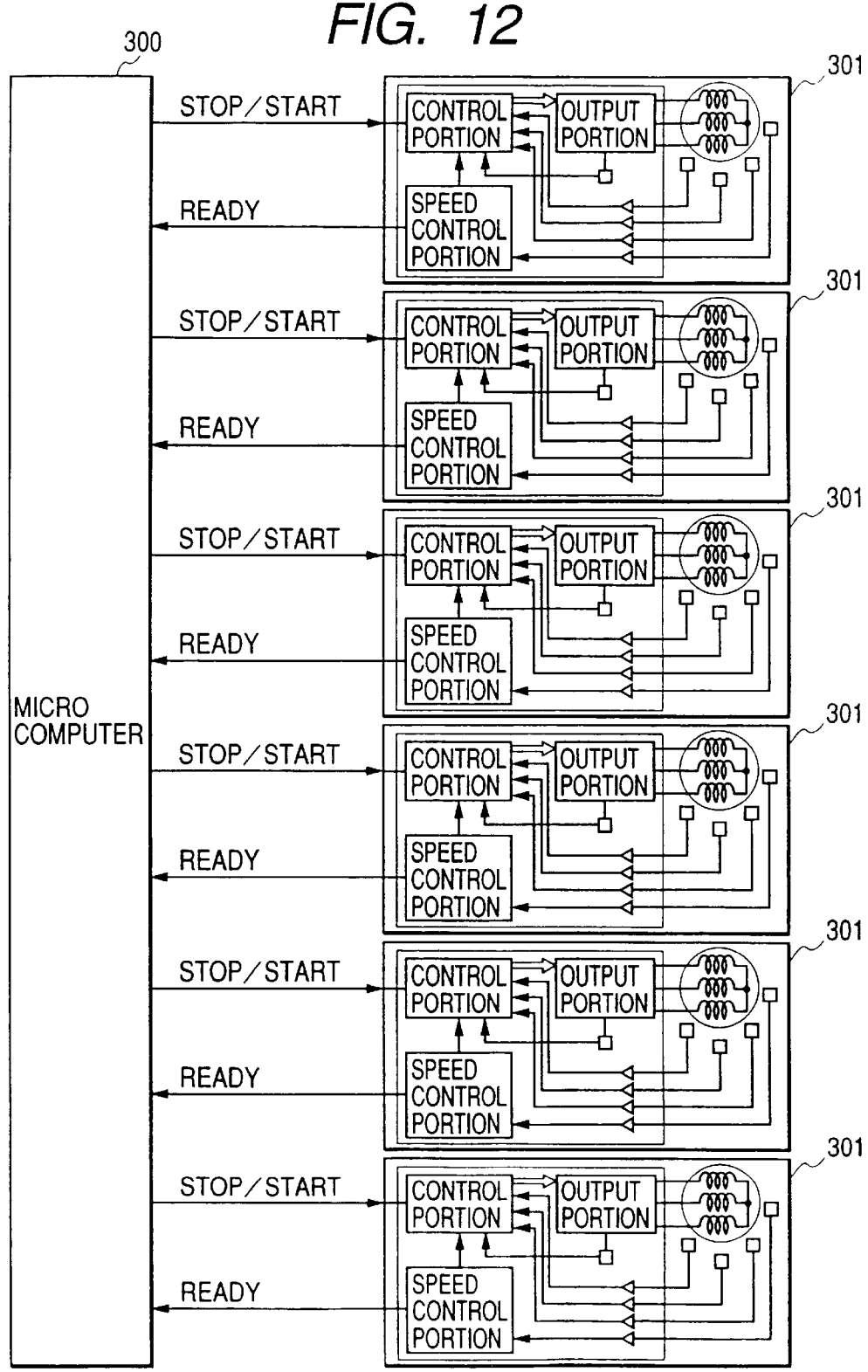
FIG. 12 is a block diagram of an entire circuit showing a conventional motor servo-control apparatus in which a plurality of motor units are connected to a single micro computer.
Figure 13:
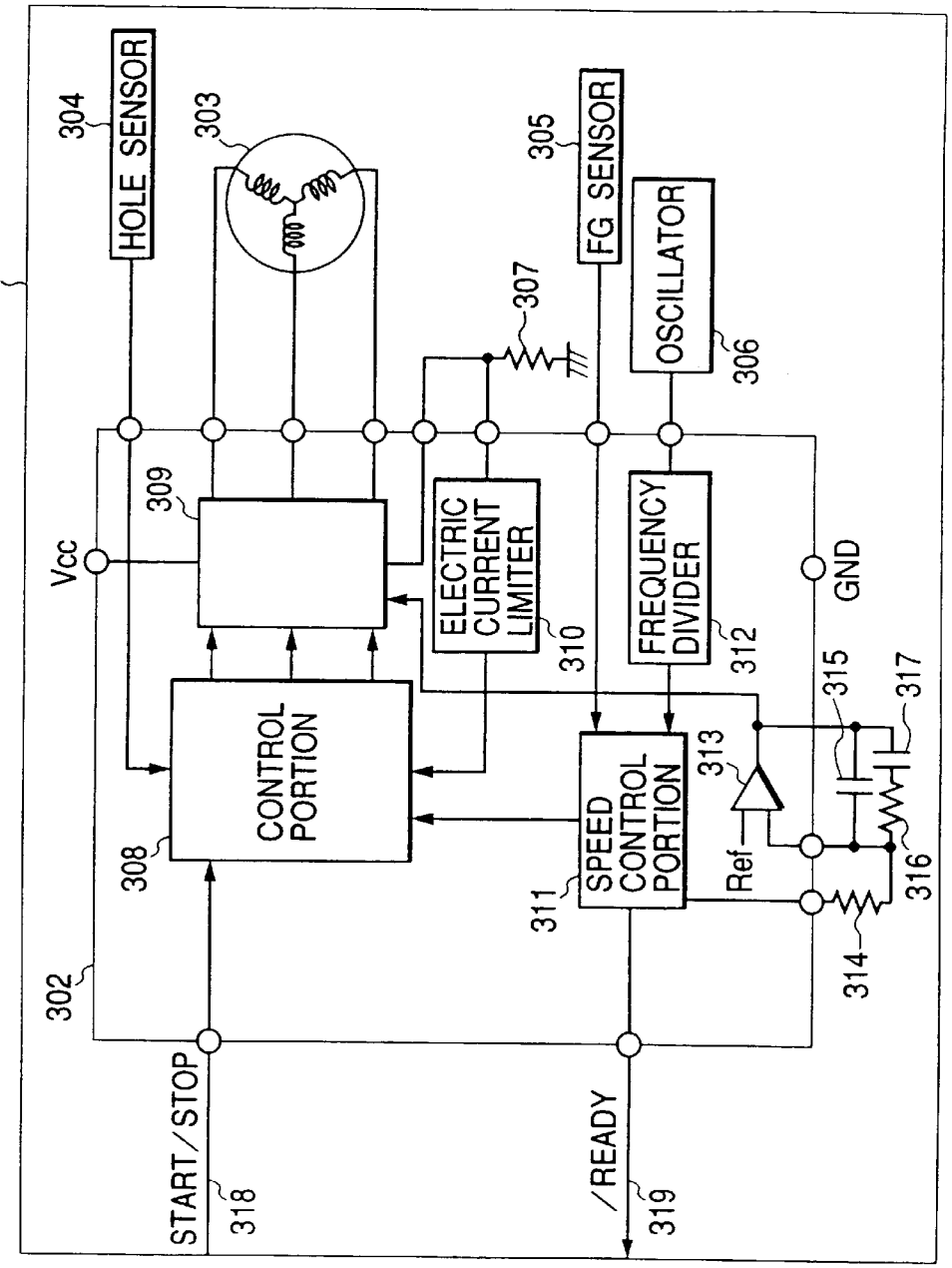
FIG. 13 is a block circuit diagram showing internal circuitry of one of the plural motor units shown in FIG. 12.
Figure 14:
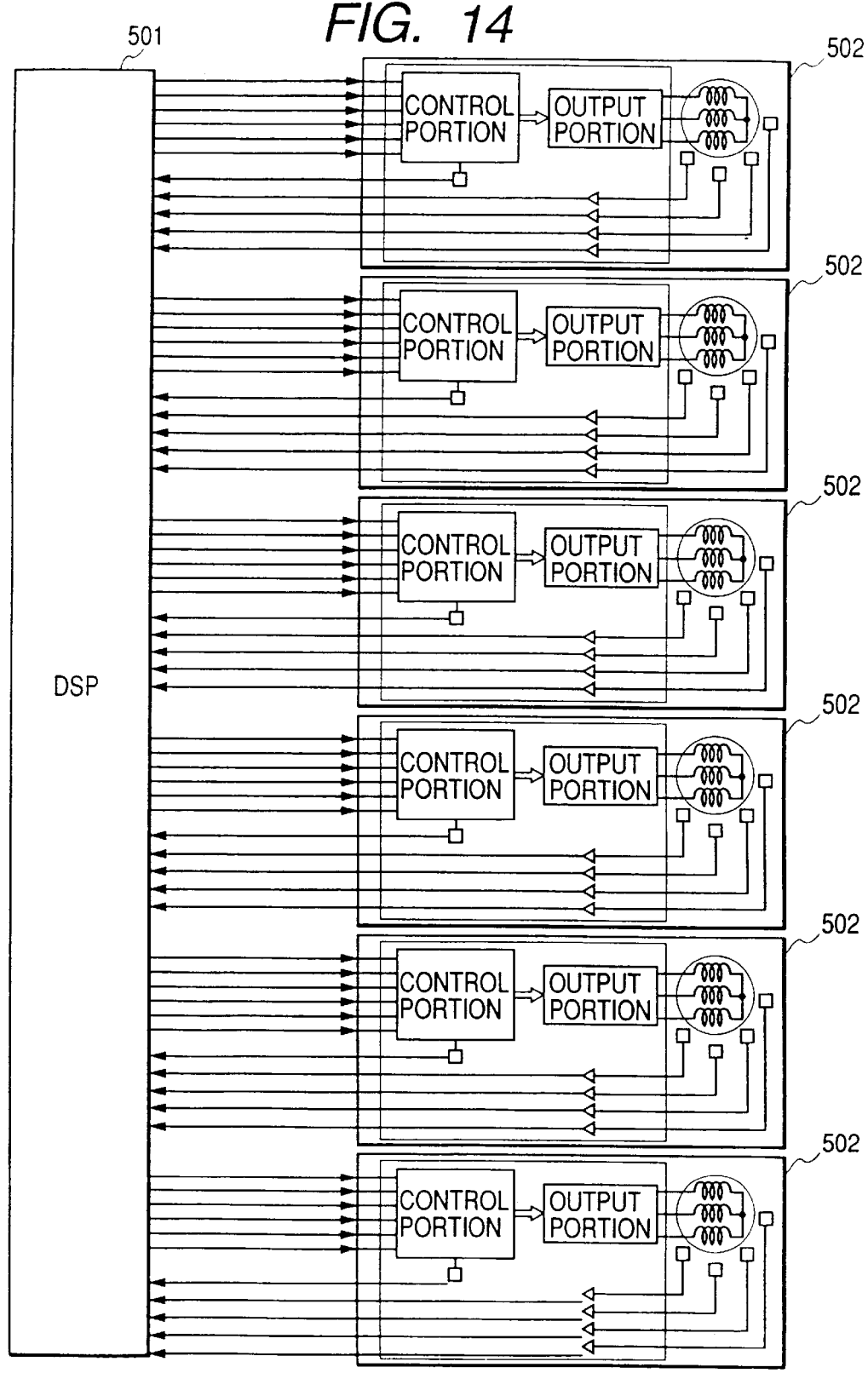
FIG. 14 is a block diagram of an entire circuit in which a plurality of motor units are connected to a single DSP, which can be considered in connection with the conventional motor servo-control apparatus.
Figure 15:
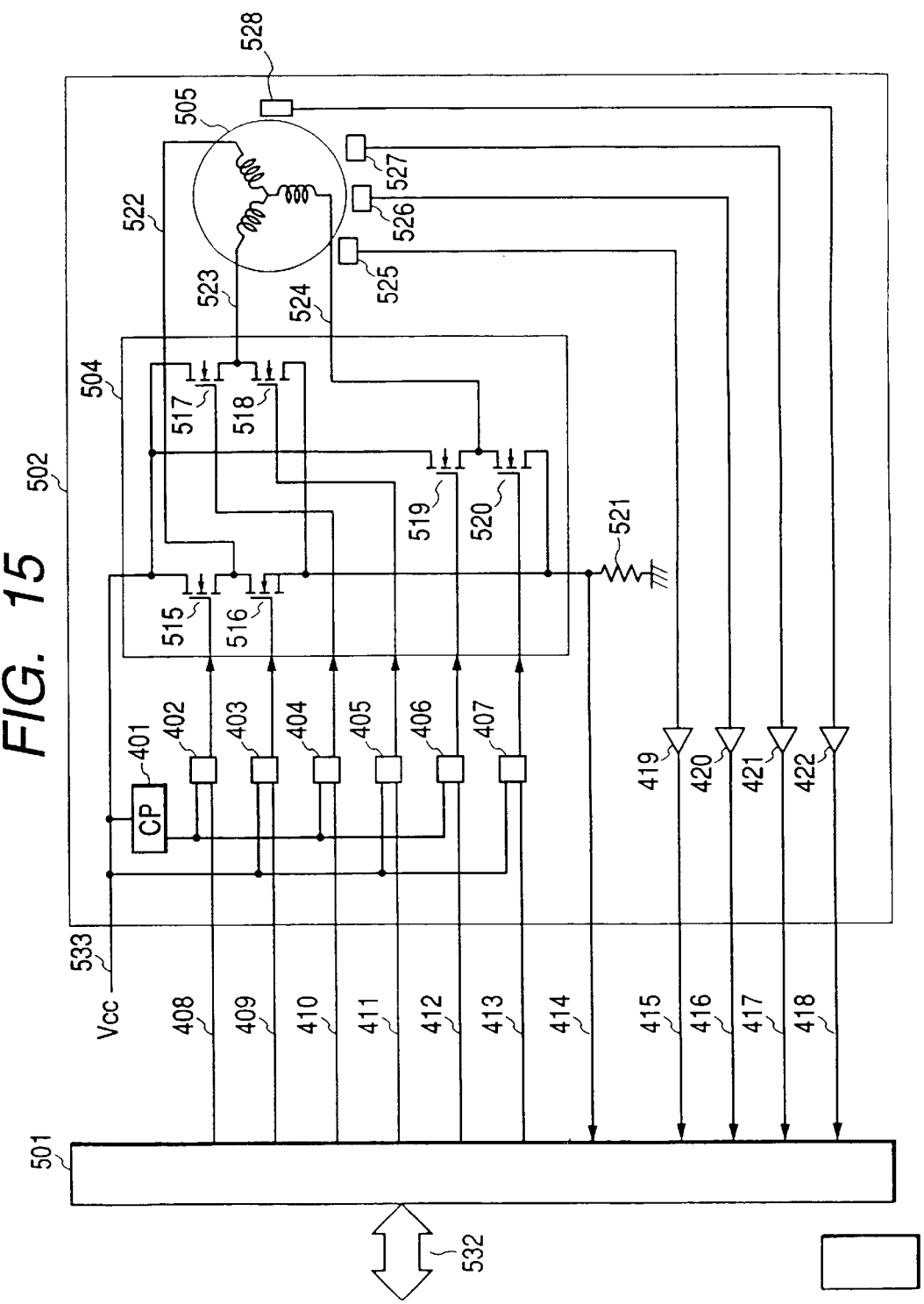
FIG. 15 is a block circuit diagram showing internal circuitry of one of the plural motor units shown in FIG. 14.

FIG. 11 is a flow chart of the servo-control of the DSP 501 shown in FIG. 10.

First of all, in a step 601, it is judged whether the servo constant is set. If No, in a step 602, the serial communication to the motor unit is effected to read-in the contents of the memory of the motor unit, thereby recognizing control information of the motor unit.

Then, in a step 603, the information recognized in the previous step, i.e., servo constant is set.

On the other hand, in the step 603, after the servo constant was set once, when the servo-control routine is carried out again, in the step 601, it is judged that the servo constant has already been set, and the routine jumps to a step 604.

Then, in steps 604 to 606, it is judged whether the motor is started or stopped.

In a control takes (not shown), when a motor start flag or a motor step flag is set and the servo-control routine is carried out, in the step 604, the flag is checked. If it is judged that the motor should be started in the step 604, in a step 605, the motor drive command is sent to the motor unit by serial communication, and the predetermined PWM value is given, thereby accelerating the motor.

On the other hand, if it is judged that the motor should be stopped in the step 604, in the step 606, the motor stop command is sent to the motor unit by serial communication, and the PWM value is made zero, thereby stopping the motor.

Since steps 607 to 614 are the same as the sets 408 to 415 in FIG. 4, an explanation thereof will be omitted.

In this way, in the second alteration, the communication between the DSP and the motor unit is effected by serial communication, and the memory means is provided in the motor unit, and the motor control parameters are previously stored in the memory means.

The DSP reads-in the servo constant of the motor through the serial communication, and the servo-control is effected on the basis of the servo constant.

Accordingly, the lookup table memory in the motor unit of the first alteration can be omitted, and many control parameter information can be stored in the motor unit, thereby further improving the servo-control accuracy.

In the present invention, while an example that the six motors are used was explained, the number of motors is not limited to plural motors, but, the present invention can be applied to a single motor.

As mentioned above, according to the present invention, the motor servo-control apparatus, which can cope with a change in speed of the motor quickly and stably, can be obtained.

In the motor servo-control apparatus according to the present invention, since the DSP effecting quick product/addition calculation by obtaining the PWM signal by inputting the rotational speed signal from the MR sensor to the DSP, the apparatus is suitable for servo-control, and, since control conditions can be programmed in accordance with load conditions (torque, inertia, gain and the like), the control has flexibility.

By combining the PWM signal from the DSP with the directly inputted switching signal in the pre-driver, the number of signal lines (number of pins) can be reduced. Further, by controlling the plurality of motors, the number of signal lines can be reduced.

By controlling the servo-control of the plural motors collectively by the single DSP, the total cost of the system can be reduced, and the system control of the plural motors can easily be performed.

Further, by using the motor servo-control apparatus having the above-mentioned construction in the image forming apparatus, in an image forming apparatus including a plurality of servo motors, by effecting the servo-control by using means for determining the servo constant of the motors in accordance with the load conditions for the driving of the servo motors and means for measuring the load inertia in the time period other than the image forming period and for calculating the servo constants on the basis of measured results, even in a system in which load inertia and torque are greatly differentiated, since the optimum servo constants are always set, the stable motor servo-control can be achieved, thereby obtaining the good image quality.

Further, by providing means for effecting control without interference between the plural servo-control loops, the plurality of motors can be servo-controlled independently by the single processor, thereby reducing the system cost.

Further, by using the DC brushless motor of inner rotor type having small inertia as the driving motor to hasten the servo-control loop, even in the load in which period of rotation fluctuation due to load fluctuation is relatively high, the stable servo-control can be effected.

According to the present invention, means for discriminating the servo motor type are provided, and the servo constant is determined by this means, and the motor is servo-controlled on the basis of the servo constant. Alternatively, the servo motor is provided with the memory means in which the servo constant is stored, and, by effecting the servo-control on the basis of read-out servo constant, even in an apparatus in which a plurality kinds of motors are used, the respective motors can always be servo-controlled with optimum servo constants.

Particularly, as is in an image forming apparatus, in a system in which motors manufactured by plural manufacturers are used in the same driving area, by discriminating the motor type or by directly getting the servo constant information optimum to the motor and by effecting the servo-control on the basis of the motor type or servo constant information, not only stability of the motor servo-control is enhanced but also the motors having different properties and manufactured by plural manufactures can be used similarly without changing the control program and the arrangement of the image forming apparatus, thereby improving productivity and motor supplying stability.

What is claimed is:

1. A pre-driver circuit connectable with both a motor driver for driving a motor and a digital processor for servo-controlling a plurality of motors by performing a programmed calculation and inputting/outputting signals through an interface pin, said pre-driver circuit comprising:

a speed detection signal receiver adapted for receiving a speed detection signal representing a rotational speed of said motor, from a rotational speed detector;

an amplifying unit adapted for amplifying said speed detection signal received by said speed detection signal receiver;

a sender connectable with one of pins of said digital processor, adapted for sending the speed detection signal amplified by said amplifying unit, to the digital processor;

a first receiver connectable with one of a plurality of pins of said digital processor, adapted for receiving a start signal for starting to drive said motor;

a second receiver connectable with one of a plurality of pins of said digital processor, adapted for receiving a pulse width modulated signal generated by the digital processor based on said speed detection signal sent by said sender for servo-controlling the rotational speed of said motor;

a position detection signal receiver adapted for receiving a position detection signal representing a rotational position of said motor, from a position detector; and a control signal generator adapted for generating a control signal to control driving signals supplied to each phase of said motor, in accordance with said pulse width modulated signal received by said second receiver and said position detection signal received by said position detection signal receiver when the start signal received by said first receiver is active, and supplying the generated signal to said motor driver.

2. A pre-driver circuit according to claim 1, wherein said control signal generator comprises:

a switching signal generating unit adapted for generating a switching signal for switching the driver signals supplied to each coil of said motor, in accordance with said position detection signal received by the position detection signal receiver; and a combining unit adapted for combining the pulse width modulated signal received by said first receiver, with said switching signal generated by said switching signal generating unit.

3. A pre-driver circuit according to claim 1, wherein said control signal generator generates six signals as said control signal to control driving signals supplied to each coil of a three phase motor having three coils.

4. A pre-driver circuit according to claim 1, wherein said second receiver receives three phase signals as said position detection signal representing a rotational position of a three phase motor having three coils.

5. A pre-driver circuit according to claim 1, further comprising:

an electrical power receiver adapted for inputting electrical power;

a charge pump unit for charge-pumping an electrical voltage input by said electrical power receiver; and an electrical power supplying unit for supplying the electrical power charge pumped by said charge pump unit with a driver for driving said motor.

6. A pre-driver circuit connectable with both a motor driver for driving a motor and a digital processor for servo-controlling a plurality of motors by performing a programmed calculation and inputting/outputting signals through a plurality of interface pins, said pre-driver circuit comprising:

a first receiver connectable with one of a plurality of pins of said digital processor, adapted for receiving a start signal for starting to drive said motor;

a second receiver connectable with one of a plurality of pins of said digital processor, adapted for receiving a pulse width modulated signal generated by the digital processor based on a speed detection signal for servo-controlling the rotational speed of said motor;

a position detection signal receiver adapted for receiving a position detection signal representing a rotational position of said motor, from a position detector; and a control signal generator adapted for generating a control signal to control driving signals supplied to each phase of said motor, in accordance with said pulse width modulated signal received by said second receiver and said position detection signal received by said position detection signal receiver when the start signal received by said first receiver is active, and supplying the generated signal to said motor driver.

7. A pre-driver circuit according to claim 6, wherein said control signal generator comprises:

a switching signal generating unit adapted for generating a switching signal for switching the driving signals supplied to each coil of said motor, in accordance with said position detection signal received by said position detection signal receiver; and a combining unit adapted for combining the pulse width modulated signal received by said first receiver, with said switching signal generated by said switching signal generating unit.

8. A pre-driver circuit according to claim 6, wherein said control signal generates six signals as said control signal to control driving signals supplied to each coil of a three-phase motor having three coils.

9. A pre-driver circuit according to claim 6, wherein said second receiver receives three phase signals as said position detection signal representing a rotational position of a three-phase motor having three coils.

10. A pre-driver circuit according to claim 6, wherein said pre-driver circuit further comprises:

an electrical power receiver adapted for inputting electrical power;

a charge pump unit for charge-pumping an electrical voltage input by said electrical power receiver; and an electrical power supplying unit for supplying the electrical power charge-pumped by said charge pump unit with a driver for driving said motor.

11. A pre-driver circuit connectable with both a motor driver for driving a motor and a digital processor for servo-controlling a plurality of motors by performing a programmed calculation and inputting/outputting signals through a plurality of interface pins, said pre-driver circuit comprising:

a speed detection signal receiver adapted for receiving a speed detection signal representing a rotational speed of said motor, from a rotational speed detector;

an amplifying unit adapted for amplifying said speech detection signal received by said speed detection signal receiver;

sender connectable with one of a plurality of pins of said digital processor, adapted for sending the speed detection signal amplified by said amplifying unit, to the digital processor;

a receiver connectable with one of a plurality of pins of said digital processor, adapted for receiving a pulse width modulated signal generated by the digital processor based on said speed detection signal sent by said sender for servo-controlling the rotational speed of said motor;

a position detection signal receiver adapted for receiving a position detection signal representing a rotational position of said motor, from a position detector; and a control signal generator adapted for generating a control signal to control driving signals supplied to each phase of said motor, in accordance with said pulse width modulated signal received by said receiver and said position detection signal received by said position detection signal receiver, and supplying the generated signal to said motor driver.

12. A pre-driver circuit according to claim 11, wherein said control signal generator comprises:

a switching signal generating unit adapted for generating switching signal for switching the driving signals supplied to each coil of said motor, in accordance with said position detection signal received by said position detection signal receiver; and a combining unit adapted for combining the pulse width modulated signal received by said first receiver, with said switching signal generated by said switching signal generating unit.

13. A pre-driver circuit according to claim 11, wherein said control signal generates six signals as said control signal to control driving signals supplied to each coil of a three-phase motor having three coils.

14. A pre-driver circuit according to claim 11, wherein said second receiver receives three phase signals as said position detection signal representing a rotational position of a three-phase motor having three coils.

15. A pre-driver circuit according to claim 11, wherein said pre-driver circuit further comprises:

an electrical power receiver adapted for inputting an electrical power;

a charge pump unit for charge-pumping an electrical voltage input by said electrical power receiver; and an electrical power supplying unit for supplying the electrical power charge-pumped by said charge pump unit a driver for driving said motor.

* * * * *

UNITED STATES PATENT AND TRADEMARK OFFICE
CERTIFICATE OF CORRECTION

PATENT NO. : 6,713,983 B2
DATED : March 30, 2004
INVENTOR(S) : Shoji Maruyama

It is certified that error appears in the above-identified patent and that said Letters Patent is hereby corrected as shown below:

Column 3,
Line 59, "serve" should read -- servo --.

Column 4,
Line 8, "not" should read -- not be --.

Column 6,
Lines 34, 36, 38 and 39, "an" should read -- a --.
Line 52, "servo control" should read -- servo-control --.
Line 64, "$505_6$" should read -- $505_6$. --.

Column 10,
Line 39, "5053" should read -- $505_3$ --.

Column 11,
Line 15, "On" should read -- ON --.

Column 12,
Line 24, "The CPU of the image forming" should be deleted.
Line 25, "apparatus sends such command to the DSP in a time period" should be deleted.
Line 26, "in which the motor driving is not required, other than image" should be deleted.
Line 27, "forming period." should be deleted.

Column 13,
Line 32, "5620," should read -- S620, --.

Column 15,
Line 24, "$\pi/300 \div t$" should read -- $(2 \pi/300 \div t$ --.

Column 19,
Line 43, "charge pumped" should read -- charge-pumped --.

UNITED STATES PATENT AND TRADEMARK OFFICE
CERTIFICATE OF CORRECTION

PATENT NO. : 6,713,983 B2
DATED : March 30, 2004
INVENTOR(S) : Shoji Maruyama

It is certified that error appears in the above-identified patent and that said Letters Patent is hereby corrected as shown below:

Column 22,
Line 12, "a" should read -- with a --.

Signed and Sealed this

Twentieth Day of July, 2004

JON W. DUDAS
*Acting Director of the United States Patent and Trademark Office*